United States Patent [19]
Simmons et al.

[11] Patent Number: 6,147,759
[45] Date of Patent: Nov. 14, 2000

[54] SYSTEM FOR DETECTING THE PRESENCE AND LOCATION OF AT LEAST ONE OBJECT IN A FIELD BY USING A DIVERGENT RADIATION SOURCE AND AN ARRAY OF OPPOSED PLURAL DETECTORS WHICH ROTATE TOGETHER AROUND THE FIELD

[75] Inventors: George R. Simmons, Haddon Heights, N.J.; Edmond J. Dougherty, Strafford, Pa.; Anders G. Andersson, San Jose, Calif.; Gregory M. Bone, West Chester; Albert Augustine, Jr., Belmont Hills, both of Pa.; Charles T. Griswold, Westampton, N.J.; Gary D. Giegerich, North Woods, Pa.; Paul T. Giegerich, Laverock, Pa.; William G. Van Ocker, Doylestown, Pa.

[73] Assignee: Laserscore, Inc., Fort Washington, Pa.

[21] Appl. No.: 09/243,138

[22] Filed: Feb. 3, 1999

Related U.S. Application Data

[60] Provisional application No. 60/073,620, Feb. 4, 1998.

[51] Int. Cl.[7] .................................................. G01B 11/03
[52] U.S. Cl. .......................................... 356/375; 250/222
[58] Field of Search ........................ 356/375; 250/222.1, 250/224

[56] References Cited

U.S. PATENT DOCUMENTS

| | | |
|---|---|---|
| 3,047,723 | 7/1962 | Knapp . |
| 3,401,937 | 9/1968 | Rockwood et al. . |
| 3,508,752 | 4/1970 | Lemon . |
| 3,619,630 | 11/1971 | McLeod et al. . |
| 3,727,069 | 4/1973 | Crittenden, Jr. et al. . |

(List continued on next page.)

FOREIGN PATENT DOCUMENTS

| | | |
|---|---|---|
| 1449050 | 11/1973 | Australia . |
| 182397 | 5/1986 | European Pat. Off. . |
| 525733 | 2/1993 | European Pat. Off. . |
| 4207497 | 9/1993 | Germany . |
| 2-44198 | 2/1990 | Japan . |
| 2 159269 | 11/1985 | United Kingdom . |
| 2196 114 | 4/1988 | United Kingdom . |
| WO 83/00920 | 3/1983 | WIPO . |
| WO 87/05688 | 9/1987 | WIPO . |

*Primary Examiner*—F. L. Evans
*Attorney, Agent, or Firm*—Akin, Gump, Strauss, Hauer & Feld, L.L.P.

[57] ABSTRACT

An apparatus detects the presence and location of at least one object in a field. The apparatus comprises a rotating arm which spins around the field, a position sensor for detecting the angular displacement of the rotating arm relative to a fixed point, and a processor. The rotating arm includes a transmitter and an opposing receiver array mounted thereon and fixed relative to each other. The receiver array includes a plurality of receivers located horizontally coplanar with each other. The receivers are concentrated towards one side of the receiver array which is aligned with a center region of the dartboard. The transmitter outputs a detection beam that emanates from a single point, such as a divergent beam. The detection beam overlaps the field and is simultaneously received at all times by the plurality of receivers of the receiver array. The receivers detect changes which occur in the field as a result of an object being in the field, manifested by shadows on the field. The processor receives output signals from the plurality of receivers and angular displacement data corresponding to the output signals, and determines therefrom the presence and location of an object in the field. The field may be a dartboard front surface and the detected object in the field may be a dart which lands on the dartboard front surface. The dartboard may be a Bandit® dartboard. The dartboard may be mounted in a housing wherein the front of the housing includes an outer catch ring area having a plurality of removably attachable catch ring segments made of dart-permeable and dart catching material. The processor detects when a player's turn is over by detecting removal of the darts from the dartboard, and automatically advances a scoring display to the next player.

28 Claims, 26 Drawing Sheets

U.S. PATENT DOCUMENTS

| | | |
|---|---|---|
| 3,807,858 | 4/1974 | Finch . |
| 4,057,251 | 11/1977 | Jones et al. . |
| 4,266,124 | 5/1981 | Weber et al. . |
| 4,516,781 | 5/1985 | DeVale et al. . |
| 4,553,842 | 11/1985 | Griffin . |
| 4,743,769 | 5/1988 | Schwaiger et al. . |
| 4,746,770 | 5/1988 | McAvinney . |
| 4,762,990 | 8/1988 | Caswell et al. . |
| 4,789,932 | 12/1988 | Cutler et al. . |
| 4,793,618 | 12/1988 | Tillery et al. . |
| 4,855,590 | 8/1989 | Bures et al. . |
| 4,877,970 | 10/1989 | Minamikawa et al. . |
| 4,881,744 | 11/1989 | Hansen . |
| 4,974,857 | 12/1990 | Beall et al. . |
| 5,116,063 | 5/1992 | Harlan et al. . |
| 5,243,183 | 9/1993 | Barron, Jr. et al. . |
| 5,281,809 | 1/1994 | Anderson et al. . |
| 5,307,264 | 4/1994 | Waggener et al. ................. 364/413.21 |
| 5,401,033 | 3/1995 | Lychock, Jr. . |
| 5,417,437 | 5/1995 | Coppard et al. . |
| 5,448,362 | 9/1995 | Perchak . |
| 5,454,016 | 9/1995 | Holmes . |
| 5,462,283 | 10/1995 | Allen . |
| 5,477,371 | 12/1995 | Shafir . |
| 5,493,112 | 2/1996 | Welch . |
| 5,499,283 | 3/1996 | Toki . |
| 5,540,445 | 7/1996 | Lee . |
| 5,565,686 | 10/1996 | Welch . |
| 5,598,453 | 1/1997 | Baba et al. ............................... 378/146 |
| 5,805,288 | 9/1998 | Simmons et al. . |

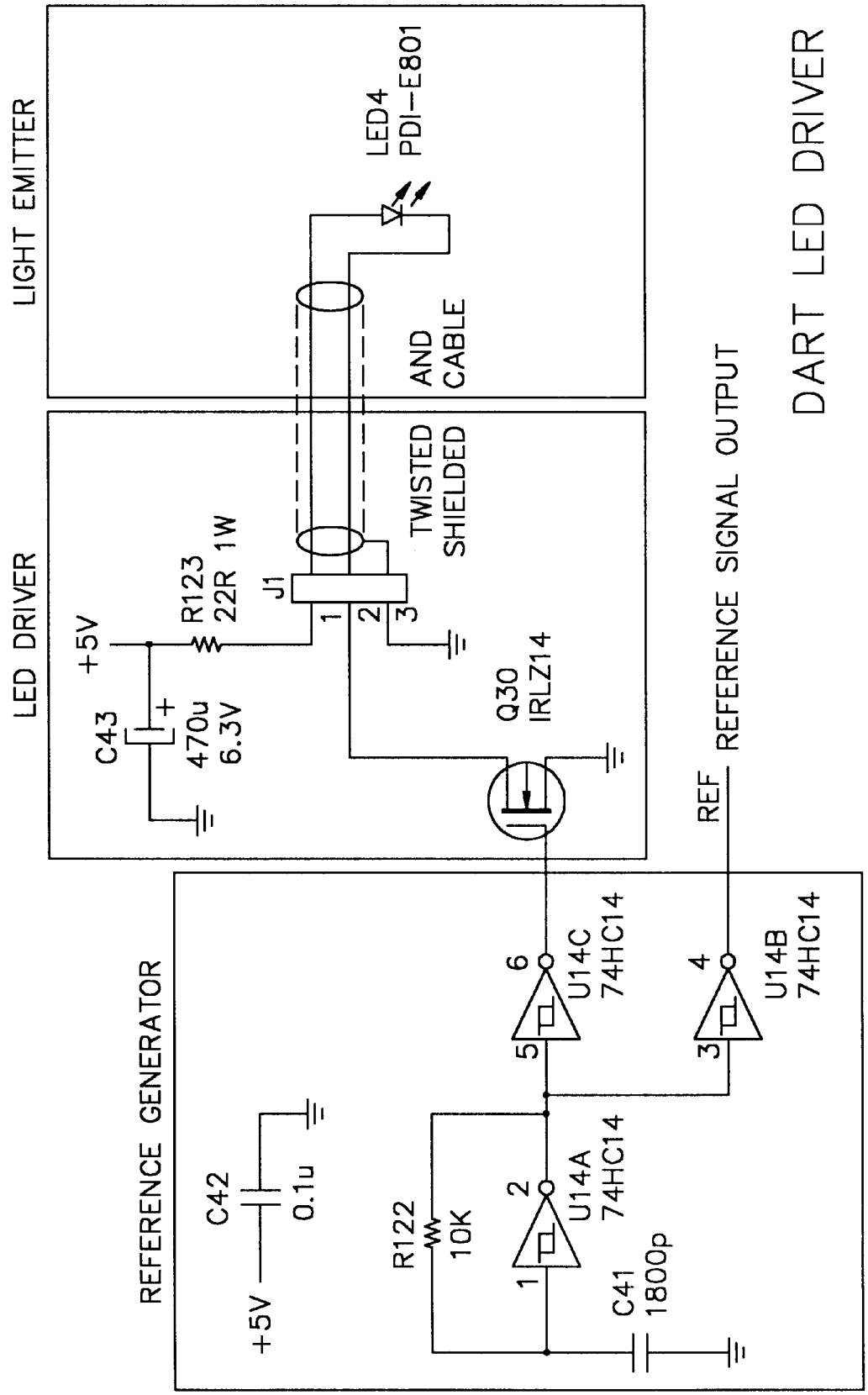
*Fig. 12* TRANSMITTER, FUNCTIONAL DIAGRAM

DART SYNCHRONOUS DETECTOR, DR

DART SYNCHRONOUS DETECTOR, BR

DART SYNCHRONOUS DETECTOR, 6TH

DART MICROPROCESSOR

Fig. 17
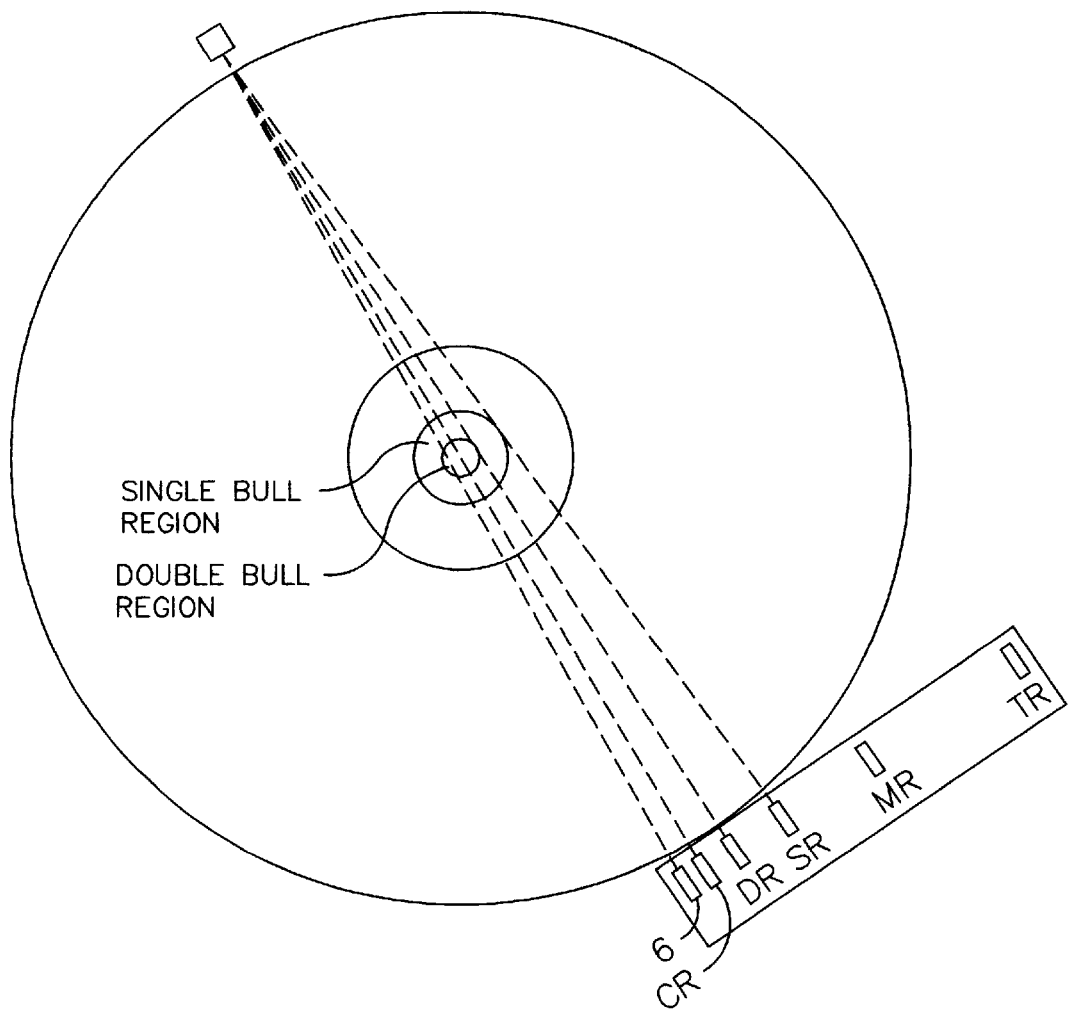
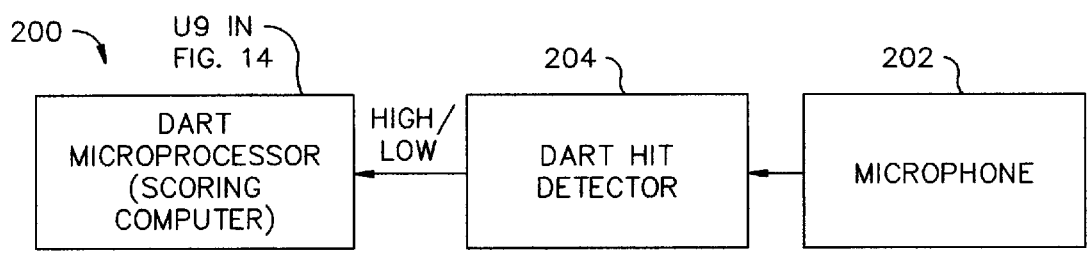
Fig. 18

MEASURED POINT IS AVERAGE OF DART 1 AND 2 READINGS

SYSTEM FOR DETECTING THE PRESENCE AND LOCATION OF AT LEAST ONE OBJECT IN A FIELD BY USING A DIVERGENT RADIATION SOURCE AND AN ARRAY OF OPPOSED PLURAL DETECTORS WHICH ROTATE TOGETHER AROUND THE FIELD

CROSS-REFERENCE TO RELATED APPLICATIONS

This application claims the benefit of U.S. Provisional Application No. 60/073,620 filed Feb. 4, 1998, entitled "SYSTEM FOR DETECTING THE PRESENCE AND LOCATION OF AT LEAST ONE OBJECT IN A FIELD BY USING A DIVERGENT RADIATION SOURCE AND AN ARRAY OF OPPOSED PLURAL DETECTORS WHICH ROTATE TOGETHER AROUND THE FIELD."

This application is related to U.S. application Ser. No. 08/611,009 filed Mar. 5, 1996, entitled "APPARATUS FOR DETECTING THE PRESENCE AND LOCATION OF AT LEAST ONE OBJECT IN A FIELD", abandoned, now U.S. application Ser. No. 08/914,026 filed Aug. 15, 1997, the disclosure of which is incorporated herein by reference. This application is also related to U.S. application Ser. No. 08/800,301 filed Feb. 13, 1997, now U.S. Pat. No. 5,805,288, entitled "APPARATUS FOR DETECTING THE PRESENCE AND LOCATION OF AT LEAST ONE OBJECT IN A FIELD," the disclosure of which is incorporated herein by reference.

BACKGROUND OF THE INVENTION

Systems for detecting object presence and location in a field by using a radiation beam which rotates around the field are disclosed in GB 2,196,114 (Hoare) and WO87/05688 (Fenner et al.). Both of these systems project radiation beams or light beams across the surface and receive the light at one or more opposed receivers. When an object is present in the field, it casts a shadow in an imaginary line between the light source and receiver. Both of these systems operate on the principle that if two such imaginary lines can be detected at different angular positions as the transmitter rotates around the field, then the position of the object may be detected from the intersection of the two lines. GB 2,196,114 (Hoare) discloses a dartboard implementation of the invention wherein a single light source and light detector rotate as a pair around the circumference of a dartboard surface. The scheme in this patent causes a dead area in the bullseye of the dartboard. No points in the dead area are detectable. Thus, darts that hit the bullseye are not detected. To detect objects in the dead area, it is necessary to physically move the scanning apparatus in a sideways direction. This additional step increases the complexity and scan time of the scanning process. WO87/05688 (Fenner et al.) also discloses an object detection device which may be used for locating darts on a dart board surface. The device uses one or more transmitters and receivers arranged around the edge of the surface. The preferred embodiment in Fenner et al. uses one or more movable transmitters which emit either narrow or divergent (broadcast) light beams that are received by stationary receivers. Alternatively, the transmitter(s) may be fixed and the receiver(s) may be movable. FIG. 1a of Fenner et al. shows a narrow light beam emitted from a single movable transmitter which is detected individually by a plurality of fixed receivers. FIG. 1b of Fenner et al. shows a divergent light beam emitted from a single movable transmitter which is simultaneously detected by a grouping of a plurality of stationary receivers.

When using automated devices to detect objects on a surface, such as darts on a dartboard, position accuracy is of primary importance. Dart players must be able to rely upon the results of the automated scorer under a variety of adverse conditions. Darts may be thrown in rapid succession, thereby requiring the automated scorer to work quickly. Leaner darts must be accurately placed in the right segment. A dart which hits very close to a previously thrown dart must be accurately detected. Darts must be accurately detected anywhere on the dart surface. It is also preferred that the automated scorer be inexpensive, easy to manufacture, and able to be retrofitted to conventional dartboards. None of the prior art schemes meet all of these criteria. The present invention fulfills the previously unmet need for an object presence and location detection device which meets all of these criteria.

BRIEF SUMMARY OF THE PRESENT INVENTION

An apparatus is provided for detecting the presence and location of at least one object in a field. The apparatus comprises a rotating arm which spins around the field, a position sensor for detecting the angular displacement of the rotating arm relative to a fixed point, and a processor. The rotating arm includes a transmitter and an opposing receiver array mounted thereon. The receiver array includes a plurality of receivers located horizontally coplanar with each other. The transmitter and receiver array are fixed relative to each other. The transmitter outputs a detection beam that emanates from a single point, overlaps the field, and is simultaneously received at all times by the plurality of receivers of the receiver array. The receivers detect changes which occur in the field as a result of an object being in the field. The processor receives output signals from the plurality of receivers and angular displacement data corresponding to the output signals, and determines therefrom the presence and location of an object in the field.

In one embodiment of the present invention, the field is a dartboard front surface and the detected object in the field is a dart which lands on the dartboard front surface. The dartboard may be a bristle dartboard having an inner bull and an outer bull arranged concentrically on the bristle dartboard, and a framework of interlocked, radial strips and circumferential strips mounted on the bristle dartboard to delineate different scoring segments, each radial strip being connected to the outer bull and a plurality of the radial strips being also connected to the inner bull. The dartboard may be mounted in a housing wherein the front of the housing includes an outer catch ring area having a plurality of removably attachable catch ring segments made of dart-permeable and dart catching material.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. It should be understood, however that the present invention is not limited to the precise arrangements and instrumentalities shown. In the drawings:

FIG. 12 is a schematic diagram of the hardware of the transmitter of FIG. 8;

FIG. 17 shows the detection beam paths for the centermost receivers of FIG. 8;

FIG. 18 shows a sonic detection circuit for use with the present invention;

DETAILED DESCRIPTION OF THE INVENTION

Figure 1:
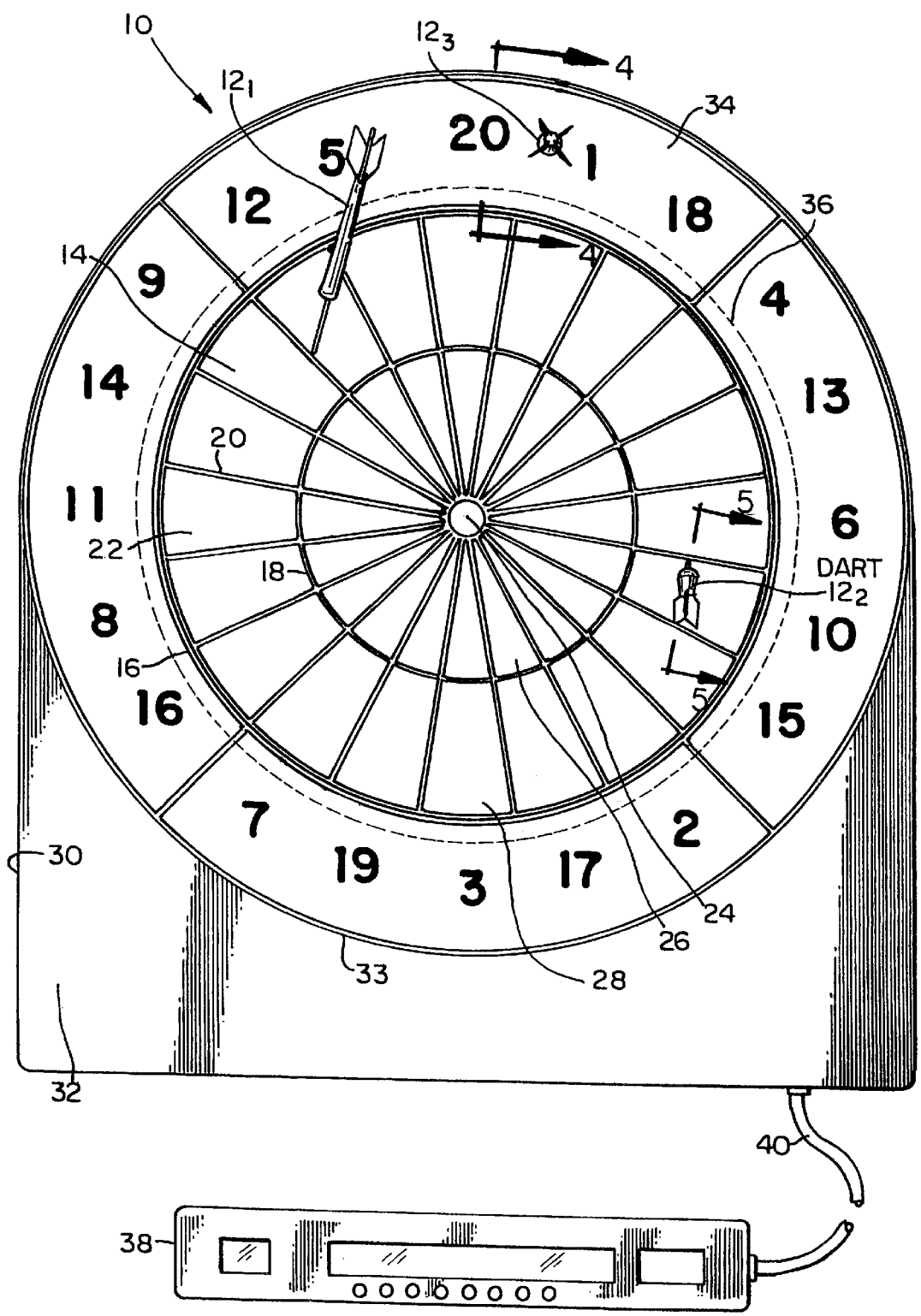
FIG. 1 is a front elevational view of a stand-alone dartboard machine in accordance with a preferred embodiment of the present invention.

Certain terminology is used herein for convenience only and is not to be taken as a limitation on the present invention. In the drawings, the same reference numerals are employed for designating the same elements throughout the several figures.

The present invention, in its most general sense, is an apparatus and method of detecting the presence and location of at least one object in a field by creating detection beams that "overlap" the field. In the context of the present invention, the term "overlap" is meant to be synonymous with "cover," encompass," or "project across." The detection beams rotate around the field, and an array of receivers detect changes which occur in the field as a result of an object being put in the field. The present invention operates on the principle that if two imaginary lines can be detected at different angular positions as the transmitter rotates around the field, then the position of the object may be detected from the intersection of the two lines.

The "field" may be any surface, and is preferably a flat surface. It is envisioned that any size or shape field may be monitored by the present invention without departing from the invention, including two and three dimensional fields. In the presently disclosed embodiment of the invention, the field is a round dartboard surface, the object(s) is a dart(s), and the system detects the presence of the dart(s) on the dartboard surface.

The present invention also includes a novel scheme for mounting a dartboard to the presence and location detection apparatus in a manner that ensures accurate dart detection.

The present invention further includes a method and apparatus for detecting the presence of darts on the dartboard surface of a particular type of dartboard which forms its spider using a framework of interlocked metal radial strips and circumferential metal strips pressed into a bristle dartboard. Such a dartboard is disclosed in U.S. Pat. No. 5,417,437 (Coppard et al.), which is incorporated herein by reference, and is manufactured by Puma Dart Products, Ltd., Katkati, New Zealand, and commercially sold as the Bandit® dartboard. The scope of the invention, however, includes detection apparatus that functions with other types of bristleboard dartboards, dartboards having other types of surface hitting material, and dartboards which have electronic dart detecting surface and use plastic-tipped darts, such as those shown and described in U.S. Pat. No. 4,057,251 (Jones et al.); U.S. Pat. No. 4,516,781 (DeVale et al.); U.S. Pat. No. 4,793,618 (Tillery et al.); U.S. Pat. No. 4,881,744 (Hansen); U.S. Pat. No. 4,974,857 (Beall et al.); U.S. Pat. No. 5,116,063 (Harlan et al.); and U.S. Pat. No. 5,401,033 (Lychock, Jr.), the subject matter of which are incorporated herein by reference.

FIG. 1 shows a front view of a dartboard machine 10 which uses the novel presence and location detection apparatus (hereafter, "object detection device") to detect darts 12 which hit (and remain attached to) dartboard 14. The darts 12 may be steel-tipped darts, which are favored by most dart players, or they may be made of any other material which allows them to stick into the dartboard 14. The dartboard machine 10 shown in the figures includes the following major components:

1. A conventional bristleboard dartboard 14. One preferred dartboard 14 is the Bandit® board discussed above. In this dartboard, a spider 16 is formed from a framework of interlocked metal radial strips (e.g., radial divider 18) and circumferential metal strips (e.g., segment divider 20) pressed into the bristle dartboard 14, thereby defining a plurality of pie-shaped target segments 22 for the different scoring areas. In FIG. 1, the spider 16 defines a bullseye 24, a plurality of inner pie segments 26, and a plurality of outer pie segments 28. In addition, as disclosed in U.S. Pat. No. 5,417,437 (Coppard et al.), the dartboard 14 may include a metal ring inside of the bullseye 24 to define an inner bullseye, the bullseye 24 thereby becoming an outer bullseye. The metal ring is not shown in FIG. 1. However, additional figures described herein include inner and outer bullseyes.

One advantage of using a dartboard which has metal dividers or metal wire overlays, instead of painted dividers, is that metal dividers or metal wire prevent darts from landing between segments, thereby eliminating disputes regarding which segment the dart has hit. FIG. 1 shows three darts, $12_1$, $12_2$ and $12_3$. The darts $12_1$ and $12_2$ both landed at edges of segments, but are clearly locatable in a single segment.

Figure 5:
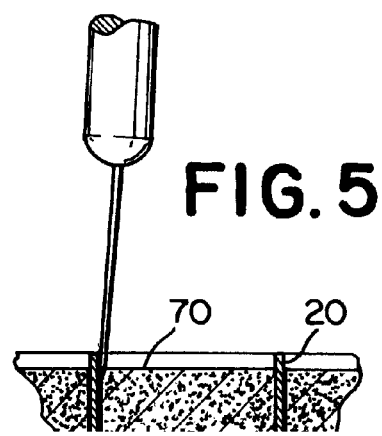
FIG. 5 is a sectional view along line 5—5 of FIG. 1.

Additional advantages are available when using a Bandit® metal divider-type dartboard with the present invention. The spider of the Bandit® dartboard projects very slightly above the dartboard surface (e.g., about 1.0 mm to about 1.75 mm). The combination of the metal spider and the use of a slightly projecting spider helps to guide darts which would have hit between segments into one or the other segment, thereby minimizing the occurrence of leaners (i.e., darts which stick into the board at large angles) at edges of the segments. Leaners cause significant detection problems in prior art dart detection schemes, such as those disclosed in GB 2,196,114 (Hoare) and WO87/05688 (Fenner et al.), because the detected location related to the shadow cast by a dart does not accurately represent the true location of the dart tip. The leaner problem is most severe when the dart hits near an edge of a segment. (Leaners which hit in the middle of segments present less of a problem, since even an inaccurate location determination may still properly place the dart in the right segment.) Multiple beams, offset from each other in planes parallel to the dartboard surface (i.e., stacked beams), are used to detect such leaners. Examples of such schemes are shown in FIGS. 1c and 1d of Fenner et al. and in FIG. 8 of U.S. application Ser. No. 08/800,301. The use of extra detection beams and the circuitry necessary to process the additional detection beam information add cost and complexity to these detection devices. The Bandit® dartboard minimizes the number of hard-to-detect leaners near segment edges, and thus eliminates the need for such multiple stacked beams when using the present invention. For example, as shown in FIG. 5, the dart $12_2$ is leaning only slightly, even though it may have initially hit the board at an extreme angle.

The present invention further takes advantage of the characteristics of the Bandit® dartboard by projecting the detection beam very close to the surface of the dartboard 14, such as about 1.5 mm above the spider 16, or about 2.5 mm to about 3.25 mm above the dartboard surface, accounting for the spider projection of about 1.0 mm to about 1.75 mm. Distances up to about 2 mm above the spider 16 are also acceptable for accurate readings. The exposed surface plane of the spider 16 is not completely planar due to manufacturing and assembly tolerances. Consequently, there may be slight elevations in the spider 16. Also, the surface of a bristle dartboard is not completely smooth due to manufacturing tolerances. Furthermore, over time, pieces of the bristles protrude from the surface and foreign material becomes stuck to the surface. As a result, if the detection beam is projected at or extremely close to the surface, such as less than 1 mm above the surface, and assuming that there is no raised spider 16, the detection beam would likely be broken by the dartboard surface protrusions and erroneous detection signals would be generated. The dartboard surface protrusions generally do not extend beyond the raised spider 16. Thus, by transmitting the detection beam slightly above the raised spider 16, the number of erroneous detection signals caused by surface protrusions and elevations in the spider 16 are minimized or reduced to zero, yet the detection beam is still close enough to the dartboard surface so that an accurate determination can be made regarding which segment the dart has landed in.

Figure 9A:
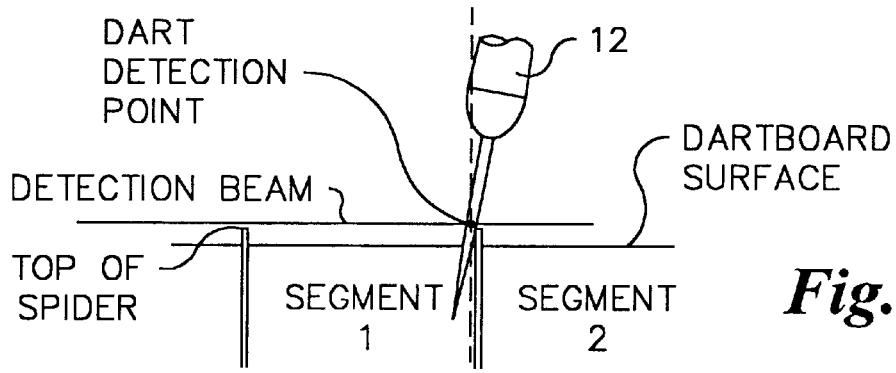
FIGS. 9A, 9B and 9C illustrate how the present invention minimizes scoring inaccuracies caused by leaners.
Figure 9B:
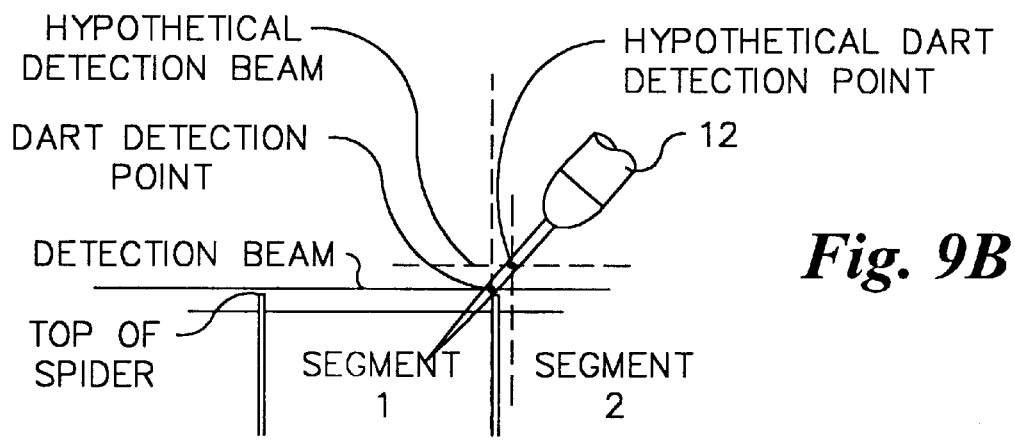
Figure 9C:
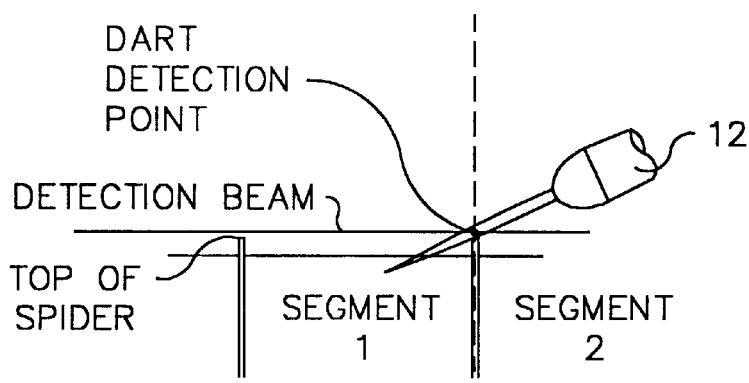

Referring again to the problem of leaners, the Bandit® dartboard also reduces the incidence of scoring inaccuracies when a dart leans across two adjacent segments. Consider FIGS. 9A, 9B and 9C wherein the dart 12 enters segment 1 of the dartboard 14 at an angle, leaning over segment 2. The angle of incidence (i.e., the amount of leaning) increases from FIGS. 9A to 9C. In FIG. 9A, the dart detection point clearly places the dart 12 in the correct segment (segment 1). However, as the amount that the dart 12 leans over segment 2 increases, the dart detection point shifts to the right. In FIG. 9B, the dart detection point is still sufficiently within segment 1 to be properly scored. In FIG. 9C, the dart is leaning so much that the dart detection point is between segments 1 and 2, and accurate scoring is no longer possible. Of course, if the leaning became even more severe than shown in FIG. 9C, the dart detection point would move into segment 2, resulting in a clearly erroneous segment detection.

When using the Bandit® dartboard, darts which hit the dartboard at extreme angles such as shown in FIG. 9C tend to fall out of the dartboard upon impact, and thus do not cause scoring errors.

FIG. 9B further illustrates the importance of using a detection beam which is very close to the dartboard surface. If the hypothetical detection beam is used, the dart detection point shifts significantly to the right, and moves into segment 2, thereby causing a scoring error.

Figure 4:
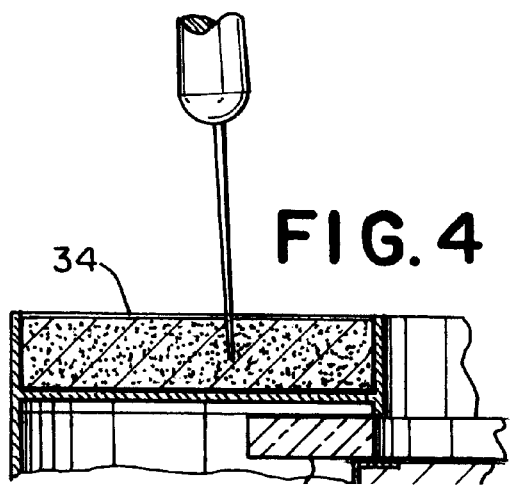
FIG. 4 is a sectional view along line 4—4 of FIG. 1.

2. A cabinet or housing 30 for mounting the dartboard 14 thereto. Front cover 32 of the housing 30 is visible in FIG. 1. The front of the housing 30 includes an outer catch ring area 33 comprised of one or more, and preferably a plurality of, removably attachable and interchangeable catch ring segments 34 (shown more clearly in FIG. 4). The catch area 33 is made from four such catch ring segments 34. The catch ring segments 34 are made from any dart-permeable and dart catching material. Two suitable materials are rubber and high density neoprene. FIG. 1 shows the dart $12_3$ which landed dead straight into the upper catch ring segment 34.

3. A clear lens protective ring 36 (shown more clearly in FIGS. 3 and 4) spaced between the outer circumferential edge of the front surface of the dartboard 14, and an inner circular edge of the housing 30. The protective ring 36 prevents stray darts and debris from entering the interior of the dartboard 14.

4. A display 38 for communicating the player score based on detected dart hits, and for receiving inputs from players regarding game commands. The display 38 is functionally similar to conventional dartboard displays, and thus is not described in further detail herein. The display 38 includes a conventional display controller (not shown). However, a novel feature of the present invention is that the display 38 is detachable from the housing 30. Conventional dartboard displays, such as those used in the electronic dart patents cited above are integrated into the dartboard machine housing. Such machines are used with plastic-tipped darts which will not damage display components if hit. Since the present dartboard 14 may be used with steel-tipped darts which may damage display components if hit, it is preferred that the display 38 be physically moved out of hitting range of the dartboard 14 to avoid damage by stray darts 12. In FIG. 1, the display controller of the display 38 communicates with the electronics inside the dartboard machine 10 via cable 40. The cable 40 may be replaced by any suitable wired or wireless (e.g., radio frequency (RF) or infrared red (IR)) transmission medium.

5. An object detection device 42 mounted in part to the back of the dartboard 14, and in part to the housing 30. The object detection device is not visible in FIG. 1, but selective mechanical parts are visible in FIGS. 2, 3 and 6–8, and electrical/computer components are shown schematically in FIGS. 12, 13A–13G and 14.

Figure 2:
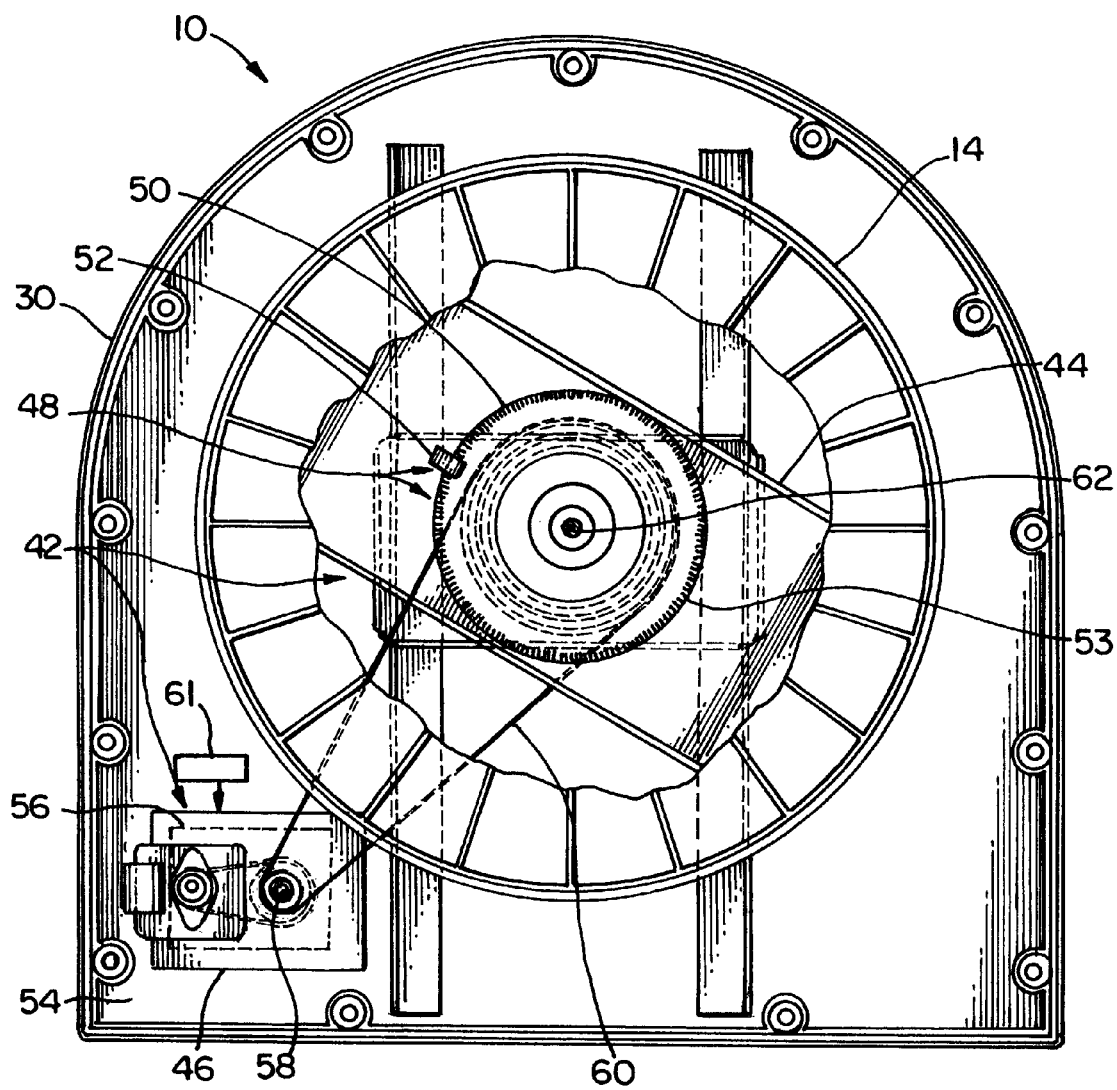
FIG. 2 is a front elevational view of the machine of FIG. 1, shown with the front cover removed, and portions of the dartboard broken away.

FIG. 2 shows the dartboard machine 10 with the front cover 32 removed, thereby revealing additional details of how the dartboard 14 and object detection device 42 are configured in, and mounted to, the housing 30. The object detection device 42 has three major mechanical subassemblies, (1) a rotating platform assembly, hereafter, "rotating arm 44", (2) a drive motor 46 for causing rotation of the rotating arm 44, and (3) a position sensor 48 for detecting the angular displacement of the rotating arm 44 relative to a fixed point.

Figure 11:
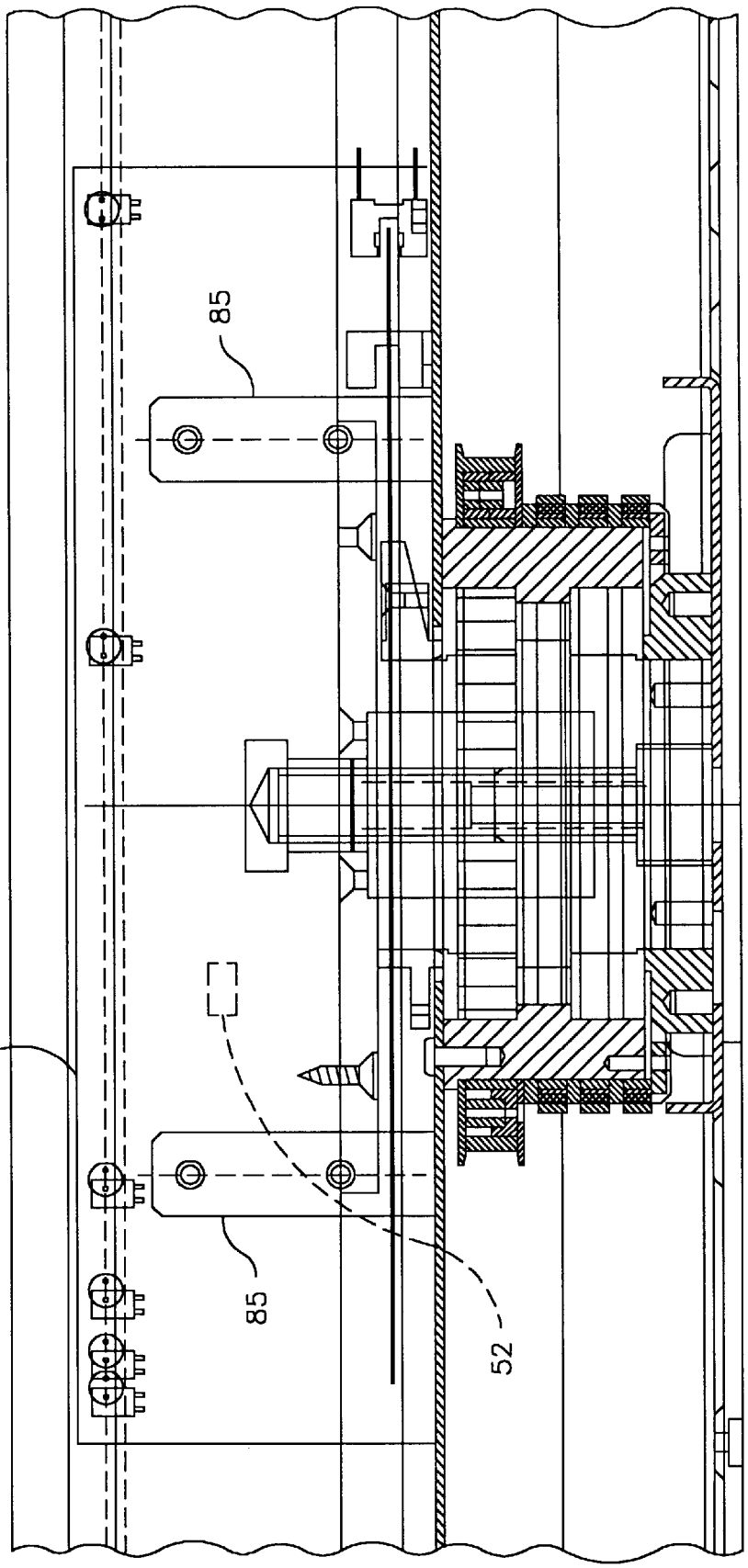
FIG. 11 shows a mid-section side view of the dartboard machine in accordance with a preferred embodiment of the present invention.

In the disclosed embodiment of the present invention, the position sensor 48 includes a transparent encoder disk 50 and an encoder sensor assembly, referred to herein as an "encoder read head 52". Together, the encoder disk 50 and read head 52 form a digital incremental encoder. The encoder read head 52 is fixed to the rotating arm 44, and thus rotates with the arm 44, and the disk 50 is stationary. Alternatively, the encoder read head 52 could be made stationary, and the encoder disk 50 could rotate. The encoder disk 50 has a series of non-transparent tick marks or marks 53, such as 512 marks, equally spaced around its circumference. The read head 52 detects the marks 53 via interruptions in a light beam emitted by the read head 52 and generates an electrical signal in the form of a pulse each time it sees one of the marks 53. The read head 52 may have a light source and detector on opposite sides of the encoder disk 50, or it may use a retro-reflective beam, wherein the light source and detector are on one side of the encoder disk 50. Alternatively, the encoder disk 50 or a printed version thereof, may be fastened to, or printed directly on, the back of the dartboard 14, and a reflective-type read head 52 may be fixed to the rotating arm 44 facing the back of the dartboard 14 to detect the marks 53. Alternatively, the outer circumferential periphery of the dartboard 14 may include a plurality of evenly spaced marks, bars, or the like, and a reflective-type read head 52 may be fixed to the receiver support 82 (described below, and shown in FIGS. 3 and 8) to detect the marks or bars. FIG. 11 shows a read head 52 mounted on the receiver support 82 for implementing this alternative scheme. The encoded disk preferably includes a protective dust cover (not shown).

As described in Appendix C, the 512 tick marks 53 are extrapolated to obtain 4096 detectable angular positions, which allows for shadow edge discrimination of less than 1/10 of a degree. Since the marks 53 and the system clock are used to obtain angular position, the rotating arm 44 need not be kept at a precisely constant speed.

Other types of digital incremental encoders may be used, such as ones which operate on magnetic or mechanical principles. Absolute encoders or analog encoders may also be used, although a digital incremental encoder is preferred because it is believed to be the easiest and most cost-effective for the chosen electronics. Since the sole function of the position sensor 48 is to detect the angular displacement of the rotating arm 44 relative to a fixed point, the position sensor 48 may be replaced by any suitable means which perform this function, such as an angular position detector associated with the drive motor 46, or with a direct drive mechanism substituted therefor.

The drive motor 46 is fixed to the housing back or rear housing cover 54, which may be made of any durable, light-weight, rigid material, such as aluminum, plastic or wood. The drive motor 46 includes a gear reduction assembly 56, such as an 1850 to 120 reduction, and an output shaft 58. The rotating arm 44 receives power from the output shaft 58 of the drive motor 46 via drive belt 60. The drive motor 46 may be replaced by any suitable means for driving the rotating arm 44, such as a direct drive mechanism. The drive motor 46 receives power from power supply and signal routing circuit board 61. A source of power, such as 120 VAC is connected to the power supply and signal routing circuit board 61. The circuit board 61 is also connected to the scoring computer, described below, and also routes power and the output of the scoring computer to the display controller of the display 38.

Figure 8:
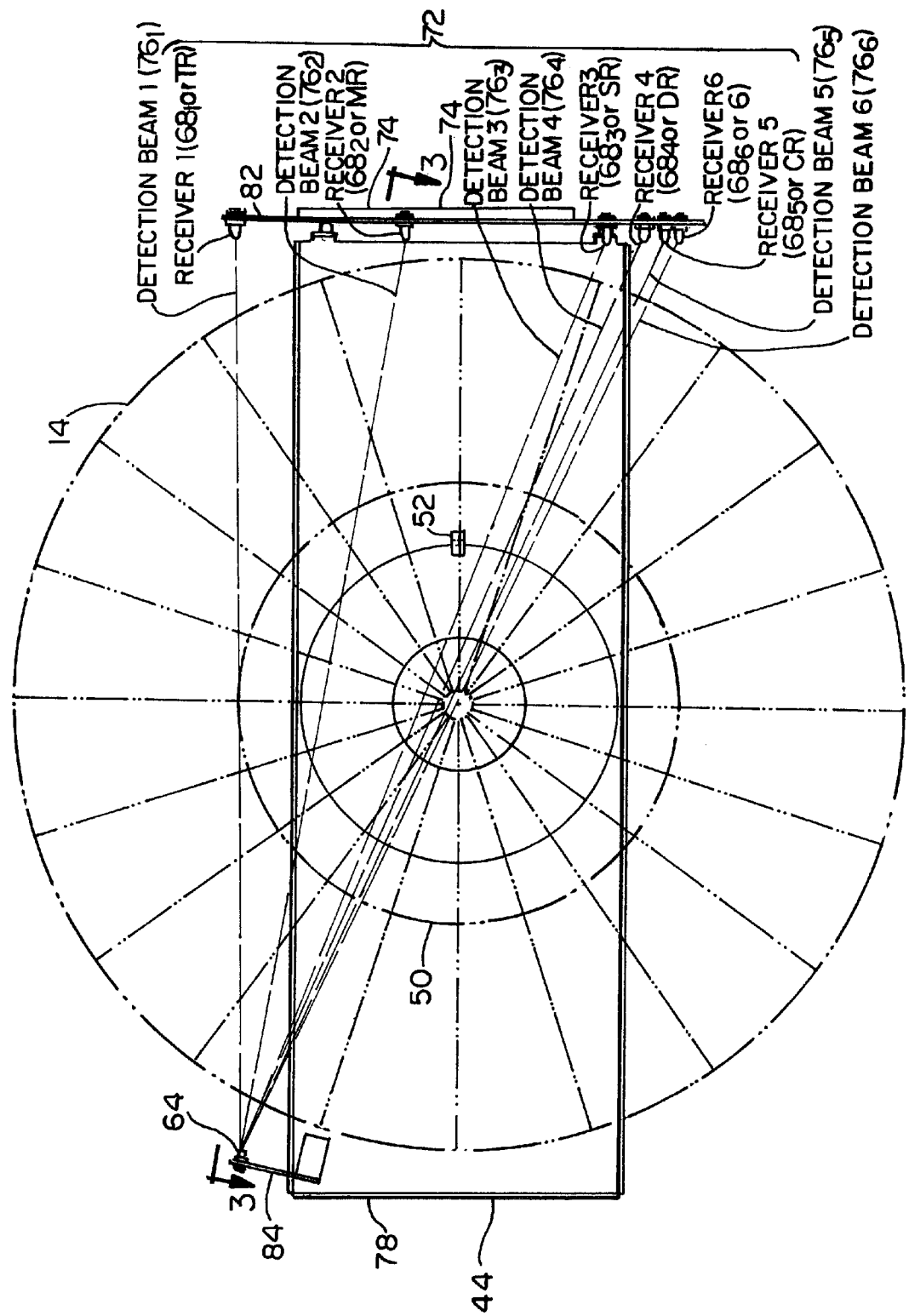
FIG. 8 is a front elevational view illustration of the inside of the dartboard showing the rotating arm, the transmitter and receivers mounted thereon, the resultant imaginary detection beams, and the arm position sensing elements.

The purpose of the rotating arm 44 is to spin a radiation source, also referred to interchangeably as a light source or radiation emitter (hereafter, "transmitter 64") and an array of opposed light or radiation detectors (hereafter, "receivers 68") around the circumference of dartboard surface 70. FIG. 8 shows the entire array of receivers 68, referred to herein in "receiver array 72." In one preferred embodiment of the invention, the receiver array 72 includes six receivers 68, referred to herein interchangeably as receivers 1–6, receivers $68_1$–$68_6$, or receivers TR, MR, SR, DR, CR, 6. One such receiver $68_3$ is visible in the sectional view of FIG. 3. The receivers 68 are all located in the same plane. The rotating arm 44 is preferably rotated about 90 to about 140 revolutions per minute (RPM). One suitable rotation speed is about 135 RPM (i.e., about 2¼ revolutions per second or about 810 degrees per second). A fast rotation speed provides faster scoring of dart hits, but increases audible noise.

The rotating arm 44 and the position sensor 48 are attached to the dartboard 14 via center bolt 62. The center bolt 62 also goes through the rear housing cover 54 to draw the mounting flange 102 against the hub 94. See, especially, FIGS. 6 and 7.

FIGS. 3 and 6–8 show additional components of the three major mechanical subassemblies and illustrate one embodiment of how the major mechanical subassemblies may be arranged. Reference should be made to FIGS. 2, 3 and 6–8 in understanding the description which follows.

Figure 3:
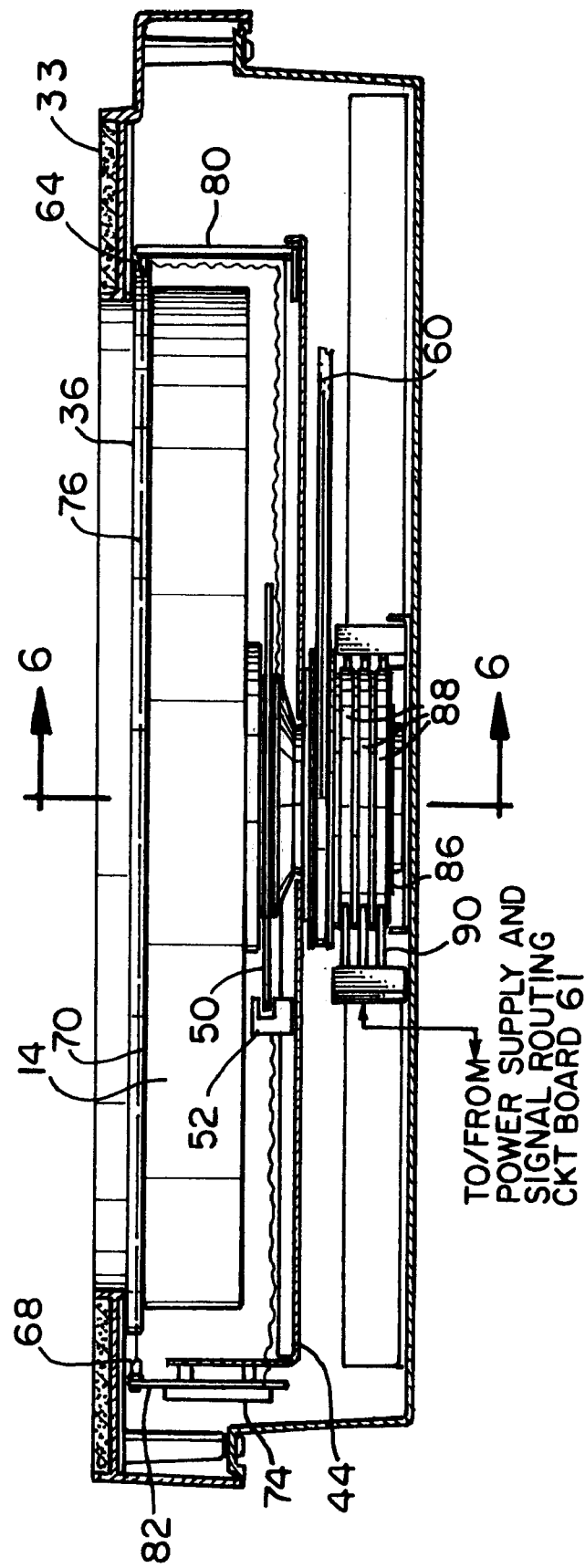
FIG. 3 is a sectional view along line 3—3 of FIG. 8

The transmitter 64 receives firing signals which are detected by the receivers 68 of the receiver array 72. The detected signals are processed by a scoring engine or scoring computer 74 to determine the presence and location of darts 12 on the dartboard surface 70. The scoring computer 74 is located on the receiver support 82 of the rotating arm 44. In one preferred embodiment of the present invention, shown in the figures herein, the receiver support 82 is a circuit board which has the scoring computer 74 and receivers 68 mounted thereon. The transmitter 64 and encoder read head 52 are connected to the scoring computer 74 via wires which run along the base of the rotating arm 44, as shown in FIG. 3. A slip-ring assembly, discussed below, provide the necessary power and communications between the scoring computer 74 and the power supply and signal routing circuit board 61.

Referring particularly to FIGS. 3 and 8, the rotating arm 44 is approximately rectangular in shape, although the exact shape and size is not critical, as long as it rotates the transmitter 64 and receiver array 72 around the area to be detected. The rotating arm 44 may be made of any durable, lightweight, rigid material such as aluminum, plastic or wood, although aluminum is preferred. Three of the four sides of the rotating arm 44 (excluding the receiver mounting side) are bent or turned up to form lips 78 for rigidity. The transmitter 64 is mounted on a support 80 extending upwards from one side of the rotating arm 44, and the receiver array 72 is mounted on a support 82 (which is the scoring computer circuit board in the illustrated embodiment) extending upwards from the other side of the rotating arm 44. The transmitter 64 is further extended from the rotating arm 44 by a mount 84. As discussed in detail below, the receivers 68 are preferably not spaced equally from each other, but instead are arranged so that particular detection beams 76 ($76_1$–$76_6$) pass through specific areas of the dartboard 14. FIG. 11 is a mid-section side view of the dartboard machine 10 and shows a more detailed view of the placement of the receivers 68 on the support 82 (which is also the scoring computer circuit board). The receiver support 82 is attached to the rotating arm 44 via tab supports 85. The transmitter 64 outputs a divergent beam which is simultaneously received at all times by each receiver 68. Each detection beam 76 is thus defined by an imaginary line drawn between the transmitter 64 and the respective receiver 68.

Figure 6:
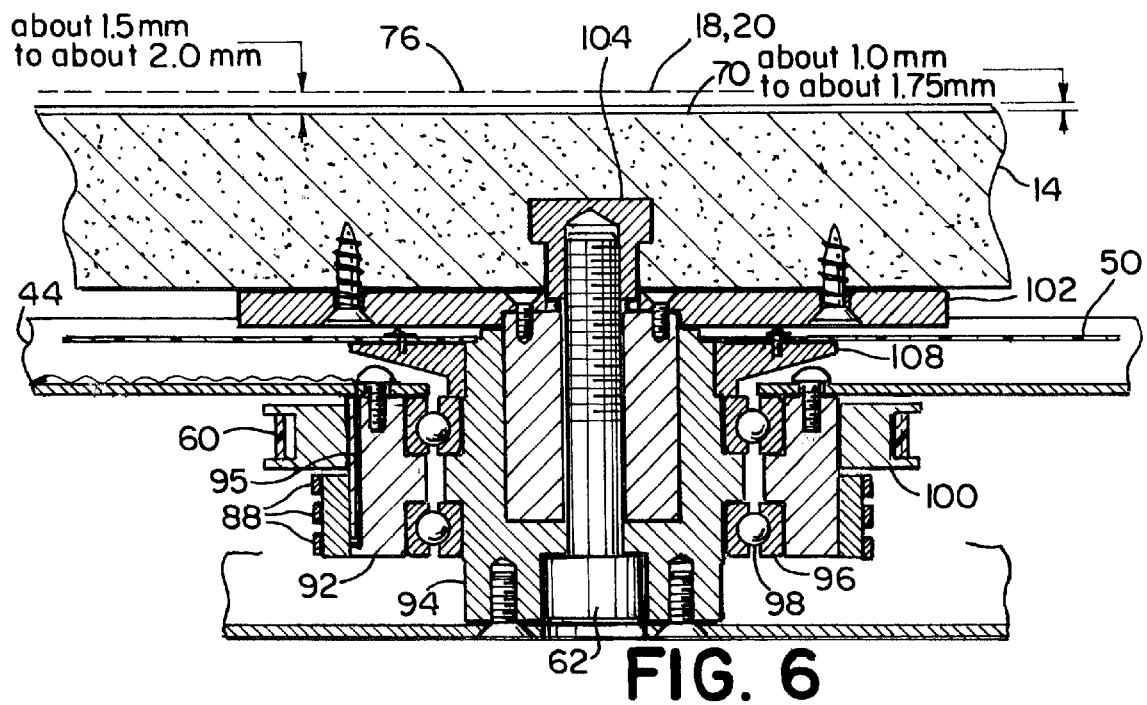
FIG. 6 is a sectional view along line 6—6 of FIG. 3
Figure 7:
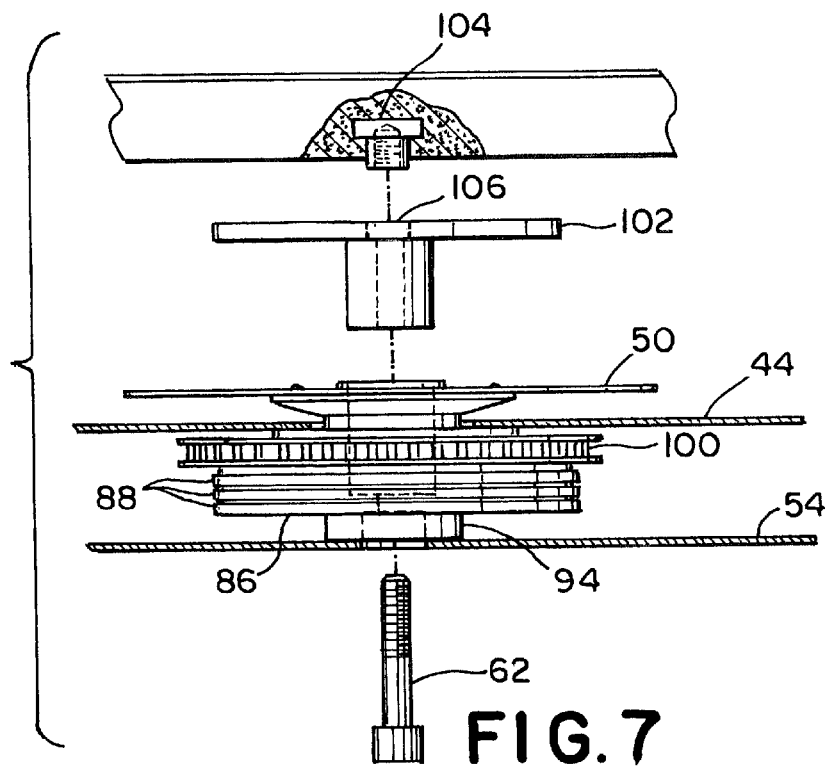
FIG. 7 is an exploded view of the dartboard mounting apparatus, the drive elements of the rotating arm, and the arm position sensing elements.

FIGS. 3, 6 and 7 show a slip ring assembly 86 comprised of rotating conductive slip rings 88 (three are shown) and non-rotating contact brushes 90 (three are shown). The slip rings 88 are located on the outer circumference of a rotor 92 which rotates around a stationary hub 94. The three slip rings 88 and their respective contact brushes 90 are used for power, ground and bidirectional communication (including dart location data), respectively. A wire is soldered to the inside surface of each slip ring 88, and the wires are routed through a groove 95 in the rotor 92 up to the rotating arm 44, and along the rotating arm 44 to the scoring computer 74. The contact brushes 90 are electrically connected to the power supply and signal routing circuit board 61. An additional set of contact brushes 90 may be used for redundancy, or to provide additional power and/or communication lines. FIG. 6 further shows a ball bearing assembly for permitting rotation of the rotor 92 around the hub 94. The ball bearing assembly includes upper and lower bearing mounts 96 with inner and outer races, and ball bearings 98 mounted therein. The rotor 92 is fixed to the rotating arm 44. The drive belt 60, via drive belt pulley 100, thus causes rotation of the rotor 92/rotating arm 44 assembly.

The non-rotating components are fixed to the dartboard 14 via mounting flange 102 (shown in two parts in FIG. 6, but which may be a unitary part) which is screwed into the back of the dartboard 14 and the center bolt 62 which extends through the hub 94 and screws into a captive mounting nut 104 embedded either fully or partially into the dead center of the back of the dartboard 14. The captive nut 104 preferably extends partially out of the back of the dartboard 14, as shown in FIGS. 6 and 7, to allow for precise centering of the rotating arm 44 and position sensor 48 mounted thereto. The opening of the mounting flange 102 facing the captive nut 104, labeled in FIG. 7 as opening 106, is sized slightly greater than the outer diameter of the captive nut 104 to receive the extending portion of the captive nut 104.

Additional components of the mounting apparatus include an encoder disk support 108 and an encoder disk collar (not shown) for attaching the encoder disk 50 to the encoder disk support 108. Attachment screws for the collar are visible in FIG. 6. The encoder disk support 108 is fixed to the hub 94, and may alternatively be formed as a unitary part of the hub 94.

Appendix A is a detailed parts list of the mechanical components of the present invention described above, and includes additional components not described above.

The mounting scheme described herein also allows the dartboard 14 to be rotated with respect to the housing 30 without having to remove any of the parts behind the dartboard 14. To rotate the dartboard 14, it is only necessary to loosen the center bolt 62, while it remains attached to the captive nut 104. When the new position is reached, the center bolt 62 is tightened to re-lock together all of the mounting components. Rotation of the dartboard 14 evens out wear on the dartboard 14 since not all segments are hit equally over time.

The dart location data is output by the scoring computer 74, and transmitted through the slip ring assembly 86 to the circuit board 61, which routes the data to the display controller of the display 38. The data is preferably transmitted in a serial stream to minimize the number of transmission channels (e.g., slip ring circuits required).

Other means may be used to communicate between the scoring computer 74 and the circuit board 61 and to power the scoring computer 74, thereby eliminating the need for the slip ring assembly 86. For example, batteries may be mounted to the scoring computer 74, and RF or IR devices may be used for communication.

As discussed above, the preferred embodiment of the present invention in a dartboard environment uses a dartboard with a raised metal spider. In such an embodiment, the detection beams 76 are preferably emitted about 1.5 mm to about 2 mm above the spider. Alternatively, the dartboard may have a spider which is flush or near flush to the surface, or which is embedded in the spider. When using a flush or embedded spider, the detection beams 76 should be emitted as close to the dartboard surface as possible, but not so close that surface protrusions of the dartboard interfere with the beam.

Figure 10:
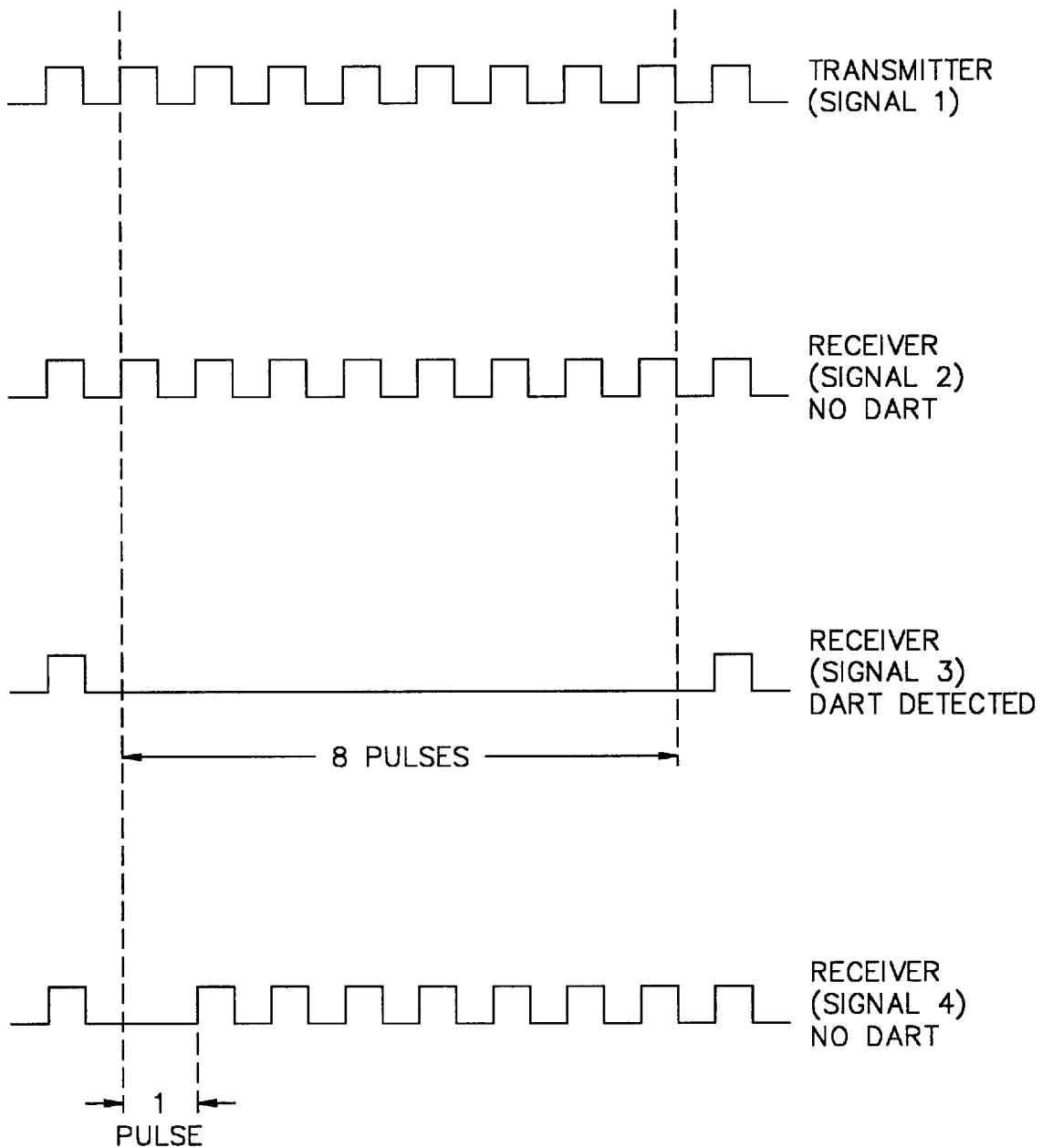
FIG. 10 shows a transmitter signal and a plurality of receiver signals caused by different conditions on the dartboard surface.

The present invention detects darts by looking for detection beam shadows cast by a dart in the path of the beam. A dart shadow persists for a predetermined angular displacement of the rotating arm 44. FIG. 10 shows a modulated detection beam emitted by the transmitter 64 (signal 1). If no dart or other obstruction is in the path of any of the opposed receivers 68 at a given instance in time during rotation of the transmitter 64 and receivers 68, then each receiver 68 outputs a corresponding signal (signal 2). However, if a dart is detected in the path of the detection beam, the receiver signal becomes a logic "0" for a predetermined number of pulses (signal 3) until the transmitter beam no longer casts a shadow on the dart. In the example of FIG. 10, which is shown solely to illustrate the principle of the detection scheme, the logic state of "0" persists for about eight transmitter pulses. Since noise or sporadic interfering matter may cause the receiver 68 output signal to occasionally go low when no dart is present, the detection circuitry should ignore low signals unless they persist for a predetermined number of pulses. For example, the receiver signal 4 is a logic low for only one transmitter pulse, and is thus ignored. To minimize the number of false signals, the frequency of the transmitter 64 is sufficiently high so that when the arm 44 is rotating at speeds of about 90 to about 140 revolutions per minute (RPM), there are a sufficient number of transmitter pulses for each pass by a dart to generate a clear dart detection signal.

Figure 13A:
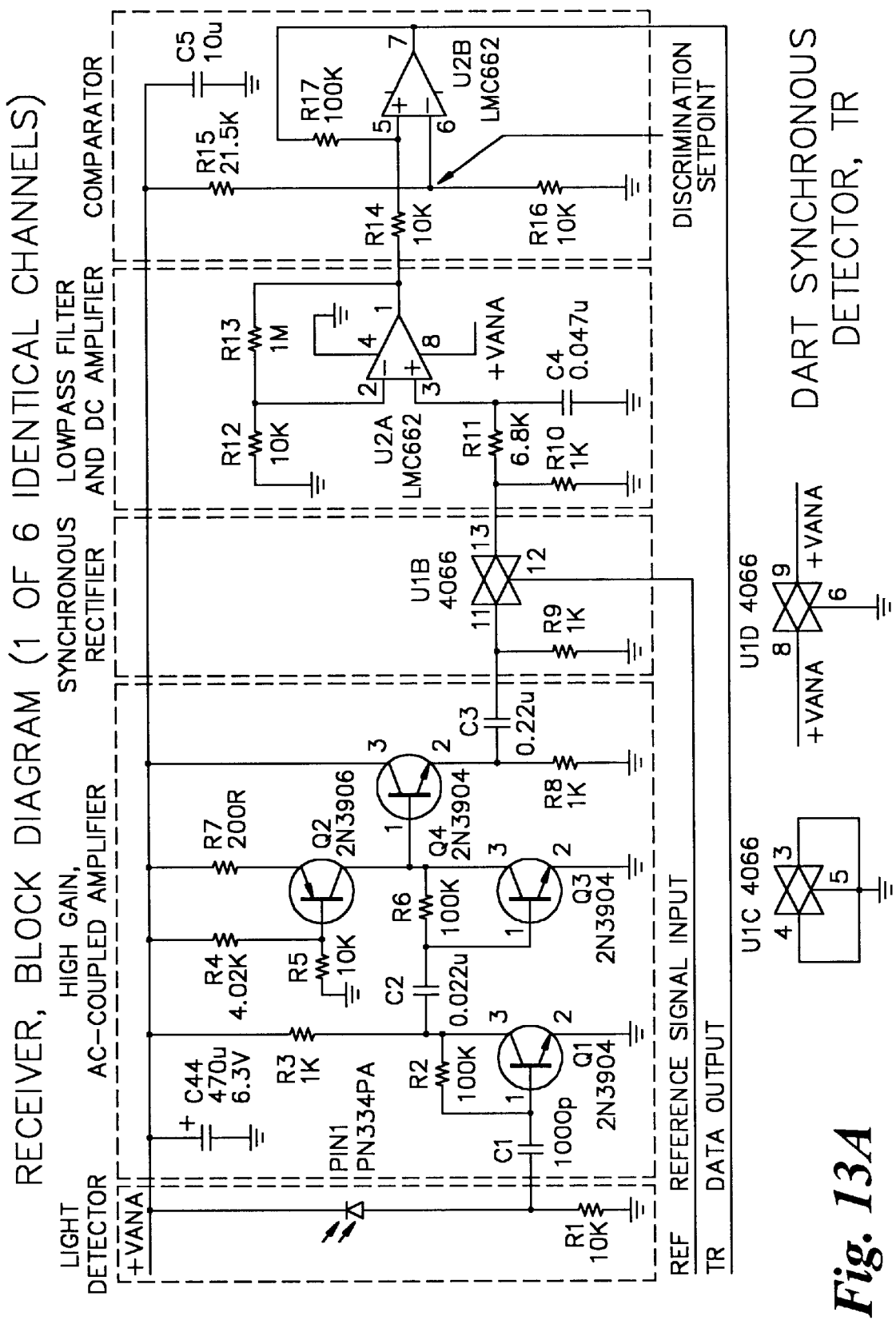
FIGS. 13A–13G are schematic diagrams of the hardware of the receivers of FIG. 8.
Figure 13B:
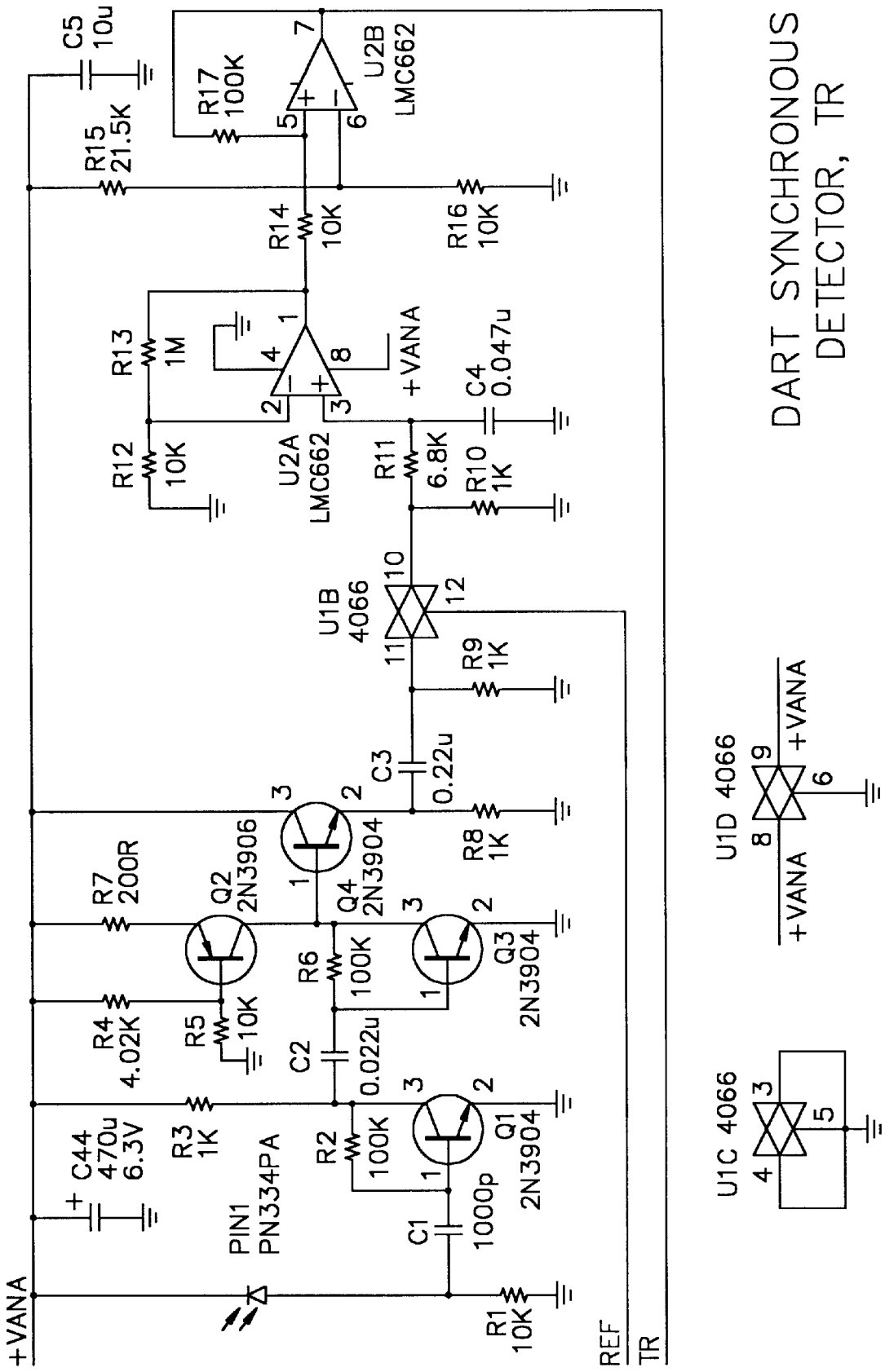
Figure 13C:
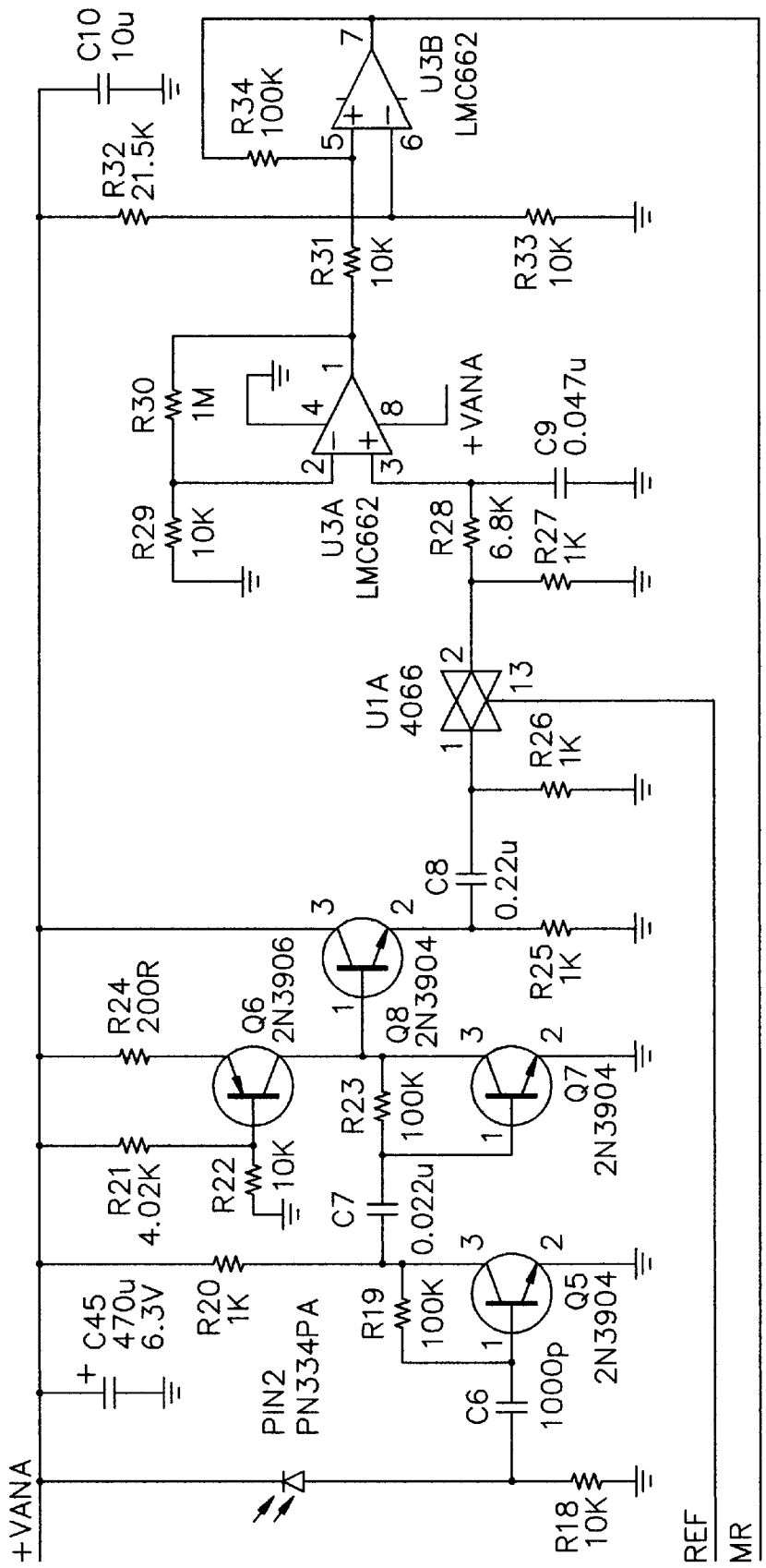
Figure 13D:
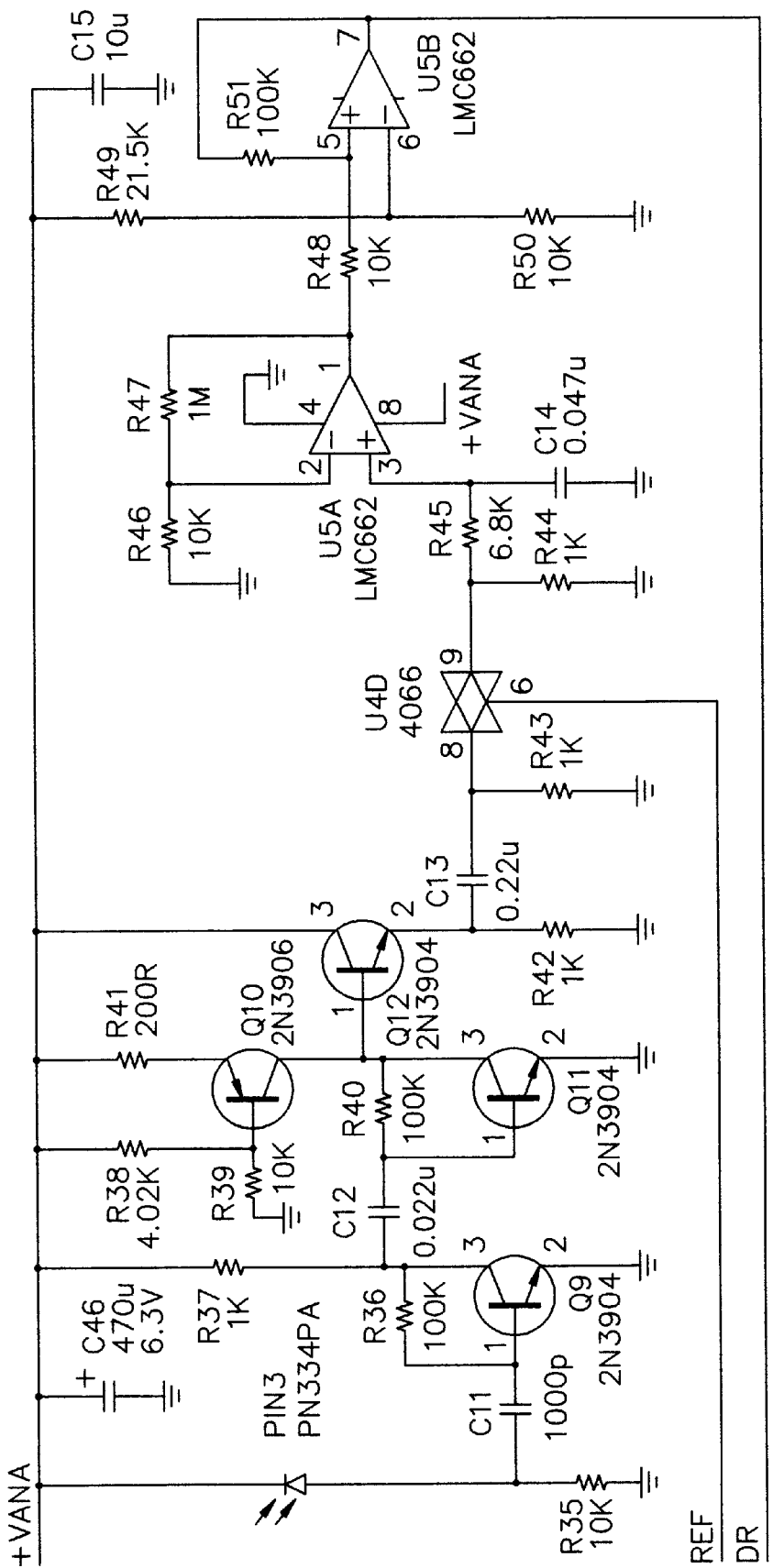
Figure 13E:
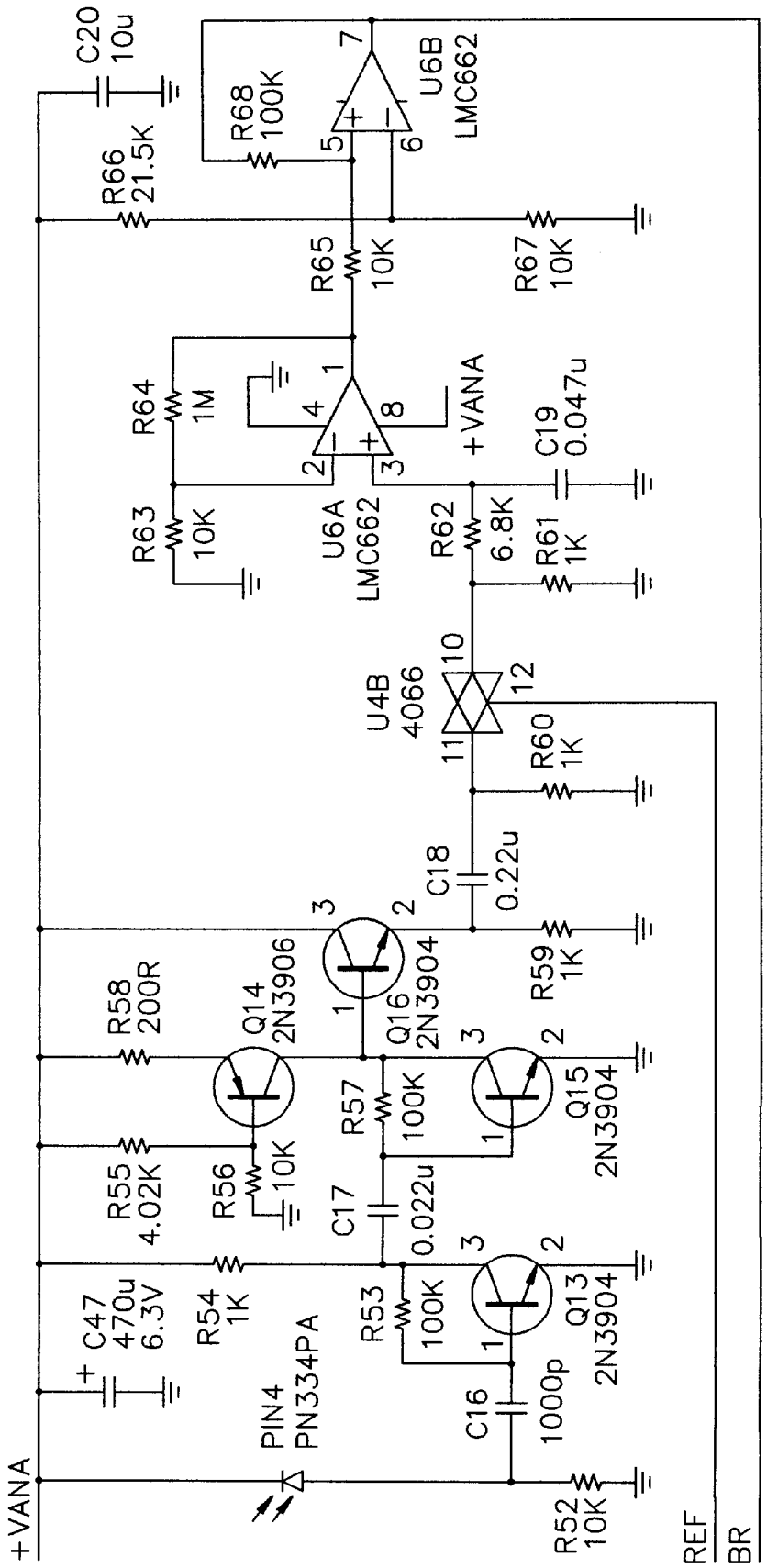
Figure 13F:
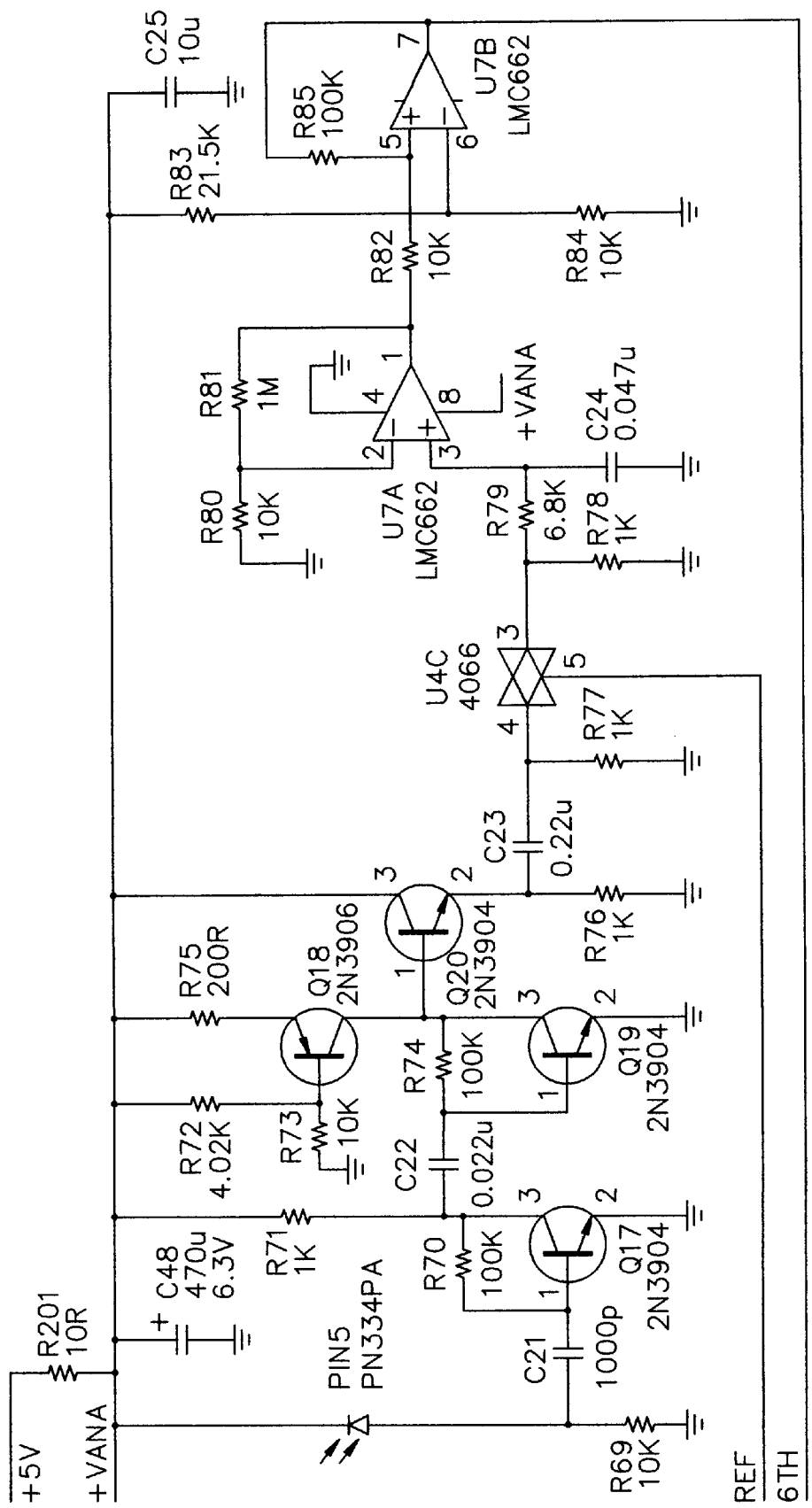
Figure 13G:
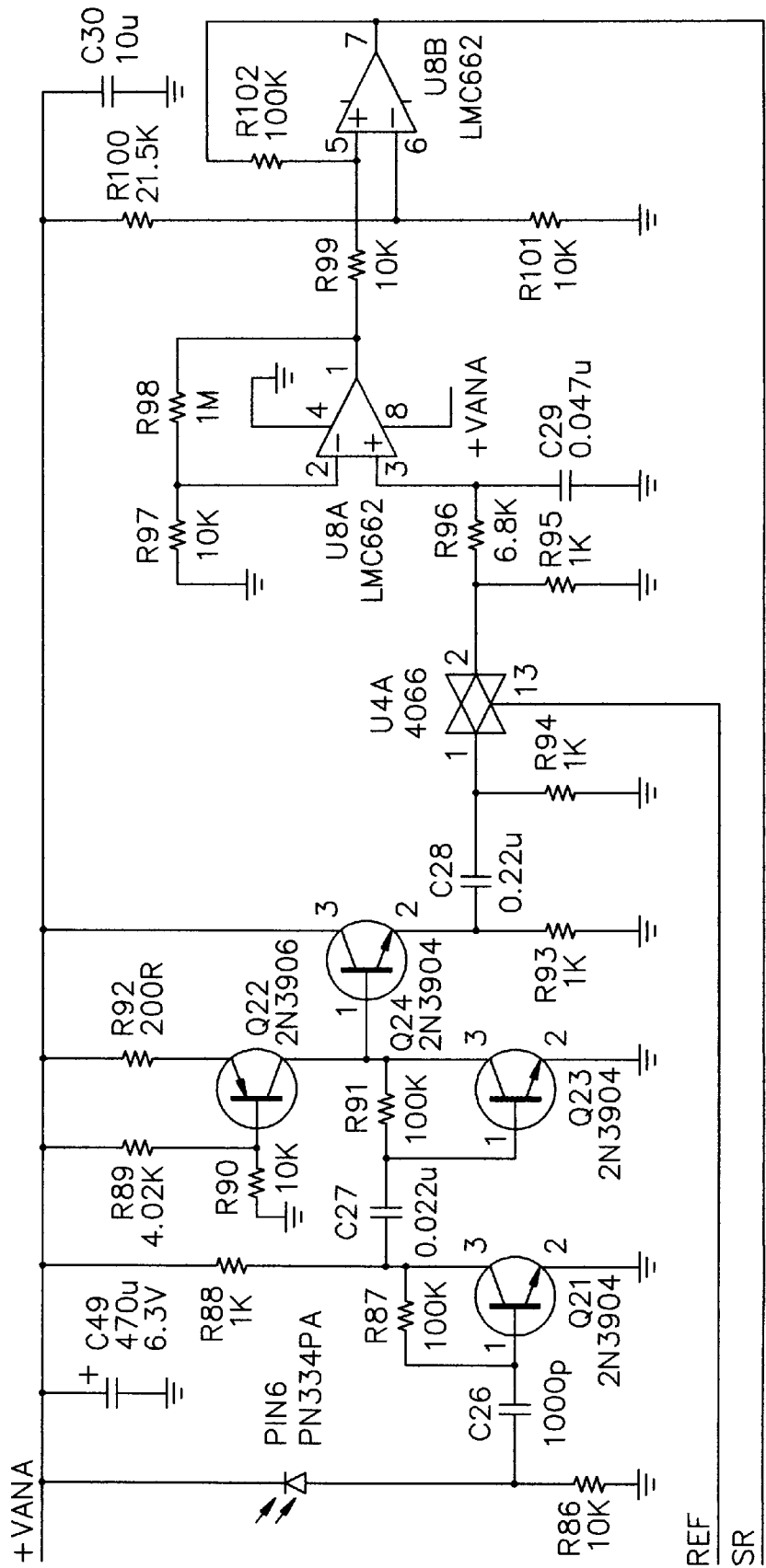
Figure 14A:
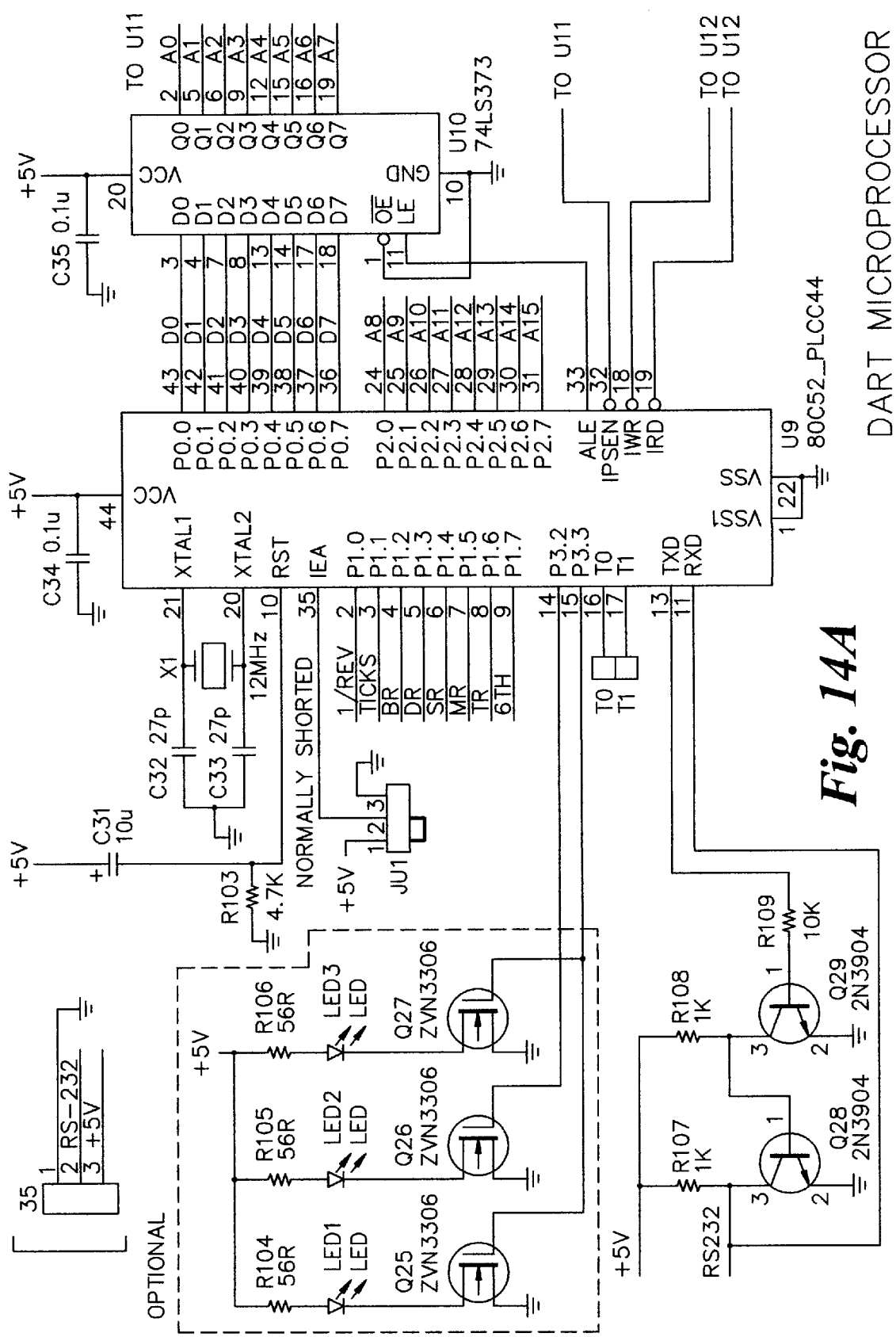
FIGS. 14A and 14B, taken together is a schematic diagram of the microprocessor of the scoring computer of FIG. 8.

FIGS. 12, 13A–13G, 14A and 14B show a detailed schematic diagram of the hardware of the scoring computer 74. FIG. 12 shows the hardware of the transmitter 64 with overlaid functional blocks. FIG. 13A shows exemplary receiver TR (receiver $68_1$) with overlaid functional blocks. FIGS. 13B–13G show each of the six receivers TR, MR, SR, DR, CR, 6 (receiver $68_1$–$68_6$) without overlaid functional blocks. FIGS. 14A and 1413, taken together, shows the processing components, including the necessary microprocessor. Appendix B is a detailed parts list of the individual components of the schematic diagrams. The operation of the scoring computer 74 hardware is self-explanatory from these figures and the parts list. Accordingly, the circuits are not described in detail herein, other than to highlight particular features, as follows.

FIG. 12 shows transmitter 64 which includes, in sequence, a reference generator, an LED driver and a light emitter. The LED emits primarily in the non-visible infrared region. The LED emits a single, divergent (broadcast) light beam which is simultaneously received at all times by each of the receivers 68, thereby simulating a plurality of individual transmitter/receiver pairs. The transmitter 64 may optionally be a laser beam. However, a laser beam embodiment is significantly more costly than an LED embodiment. The transmitter may also optionally be comprised of a six individual narrow beams which project from the same point and are aimed at the individual receivers 68. However, this scheme would be costly and difficult to implement.

A synchronous detection scheme is used to minimize the presence of erroneous detection signals caused by noise or stray receiver signals. In this scheme, the receiver signals are gated to the transmitter 64 so that signals from the receivers 68 are collected only when a transmitter pulse occurs. Accordingly, any signals detected by the receivers 68 between transmitter pulses are ignored by the processing circuitry.

FIG. 13A shows exemplary receiver TR (receiver $68_1$), which includes, in sequence, a light detector, a high gain AC-coupled amplifier, a synchronous rectifier, a lowpass filter and DC amplifier, and a comparator.

Figure 14B:
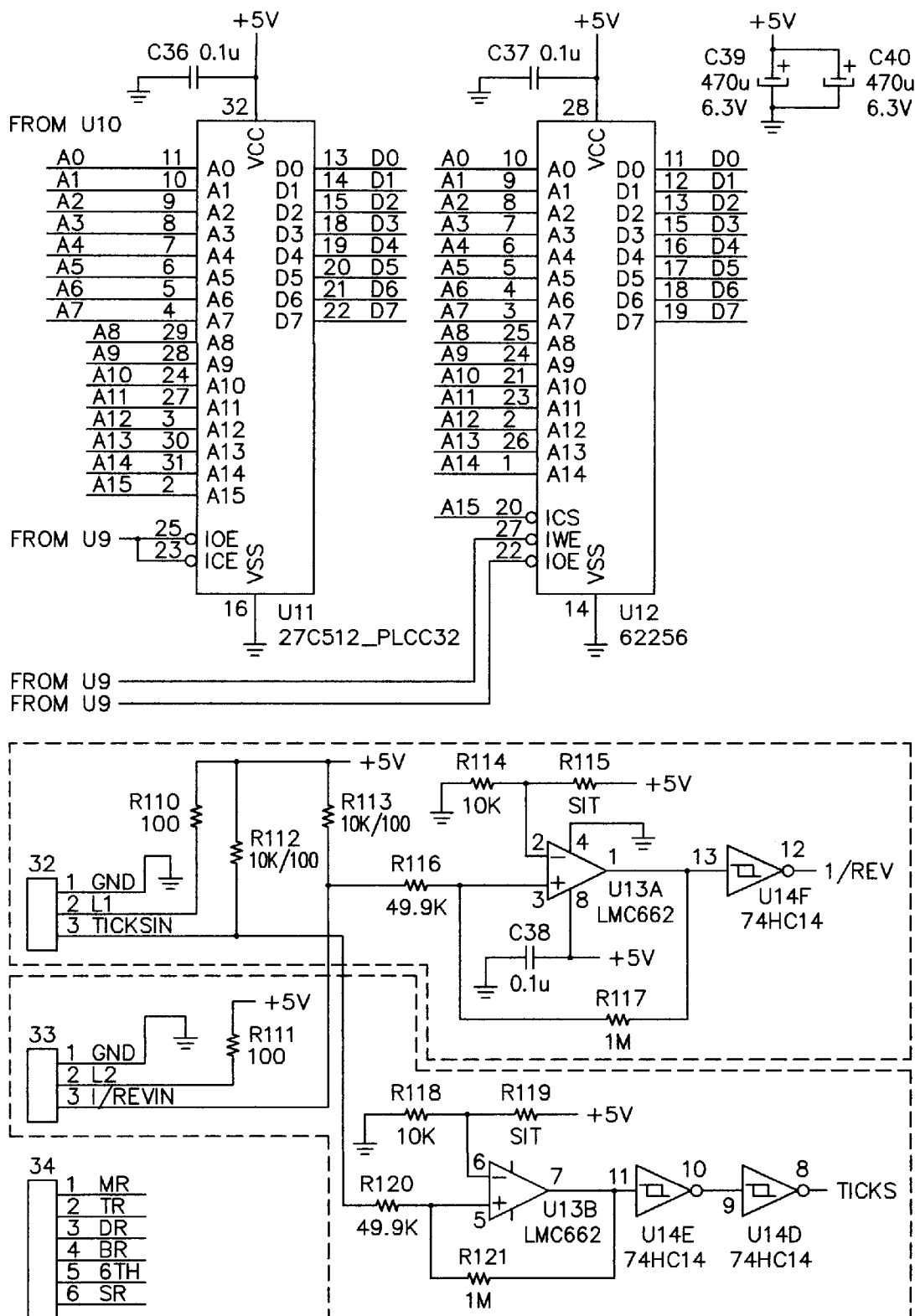

FIGS. 14A and 14B, taken together, shows one example of processing circuitry which uses four chips: (1) microprocessor U9, (2) a so-called "glue logic" chip U10; (3) EPROM U11; and (4) RAM U12 which functions as scratch memory for the microprocessor U9. In a low cost embodiment of the present invention, one suitable microprocessor U9 is a Phillips P80C32EBAA microprocessor, or equivalent. This microprocessor has no onboard ROM, and thus an external ROM must be used for storing the scoring computer program. In FIGS. 14A and 14B, taken together, the scoring computer program is stored in the EPROM U11. This embodiment is vulnerable to illegal copying because the contents of the EPROM may be read directly from the chip. In a higher cost, but more secure embodiment of the present invention, a suitable microprocessor U9 is a Phillips P87C52EBAA microprocessor, an Integrated Silicon Solution, Inc. IS89C52-20PL microprocessor, or equivalents thereto. These microprocessors have 8K of onboard memory which may be used to store the scoring computer program. If one of these microprocessors is used, EPROM U11 is omitted from the circuit. These microprocessors have security provisions to prevent the program from being read.

The six receiver outputs are input into pins 4–9 of the microprocessor U9. The microprocessor U9 also receives signals from the read head 52. In one embodiment of the invention, the microprocessor U9 samples signals from the read head 52 to detect tick marks 53. In addition, the microprocessor U9 samples signals from the read head 52 to detect the number of revolutions made by the dartboard 14, as determined by a revolution counting scheme. The two circuits for sampling the read head signals are shown in the lower middle portion of FIG. 14 (see 1/REV and TICKS signal lines).

Figure 15A:
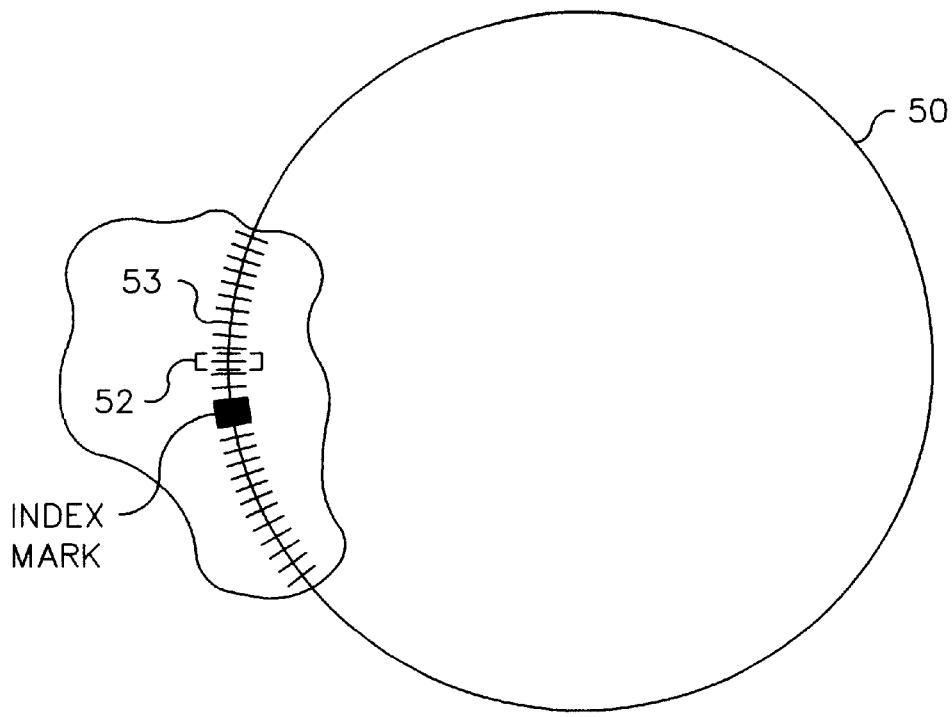
FIGS. 15A and 15B show a revolution detection scheme for use with the present invention.
Figure 15B:
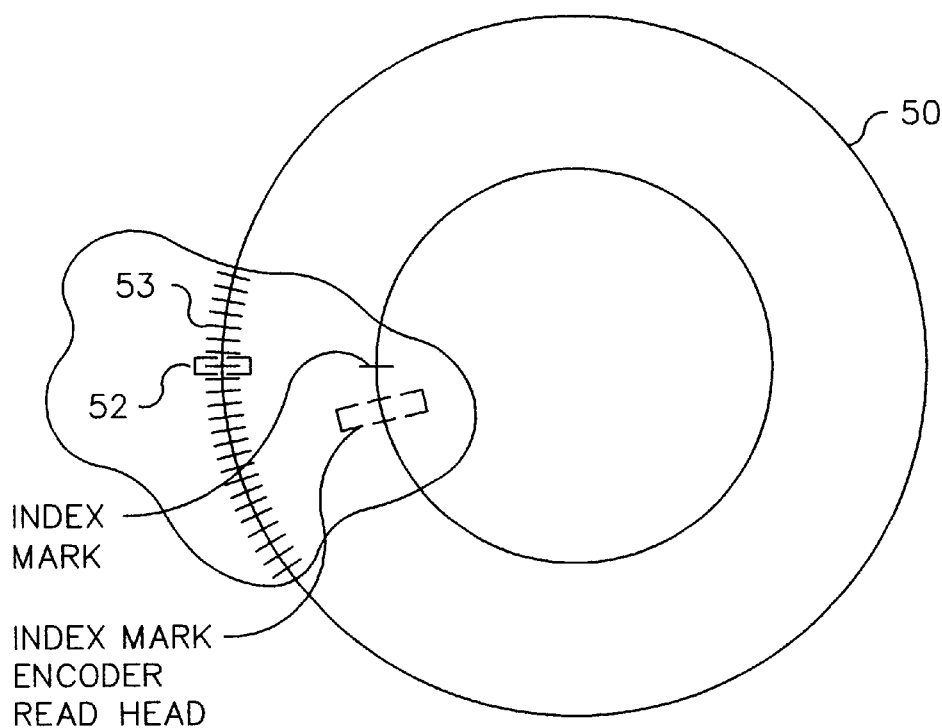

FIGS. 15A and 15B show two alternative revolution detection schemes. In the first scheme, shown in FIG. 15A, which is used in the presently disclosed embodiment, there are 510 tick marks 53, and one index mark. The index mark has the width of two marks 53 and thus is readily detectable by the encoder read head 52. In an alternative scheme, shown in FIG. 15B, there are two encoder disks 50, or two concentric circles defined on a single encoder disk 50. One circle has a predetermined number of equally spaced tick marks 52 (e.g., 512 tick marks) and an encoder read head 52, and the other circle has a single index mark and a corresponding index mark encoder read head. In either embodiment, the index mark is used during a calibration routine to obtain a reference point, such as to indicate that the rotating arm 44 is at zero degrees. The tick marks 52 are then used to determine the angular rotation in respect to the reference point.

The circuit in the upper left-hand corner of FIG. 14A is entirely optional and provides no functional capabilities. This circuit provides a visual "fun light" effect. The infrared light emitted by the transmitter 64 of FIG. 12 is not visible because the emitting frequency is outside of the range of visible light. The "fun light" circuit emits a steady glow that bathes the dartboard 14 in red light. The light functions to entertain the players and to indicate to the players that the scoring computer 74 is on.

The jumper J4 at the very bottom of FIG. 14B is also optional and provides test points for the six receivers 68.

Appendix C is a functional flowchart of the scoring computer program, and includes an explanation of each major function. This flowchart is self-explanatory and thus is not described in detail herein.

Figure 19A:
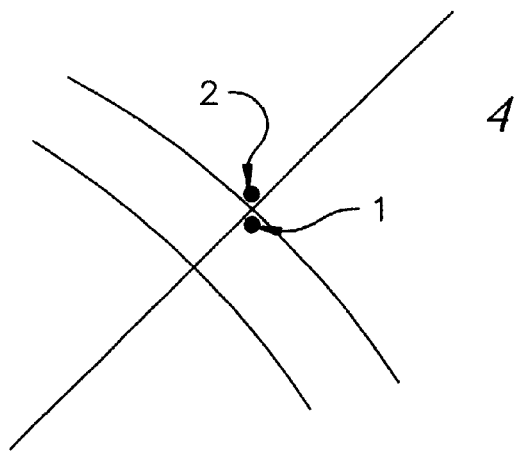
FIGS. 19A, 19B and 19C show dartboards and dartboard portions for illustrating a dart board calibration procedure.
Figure 19C:
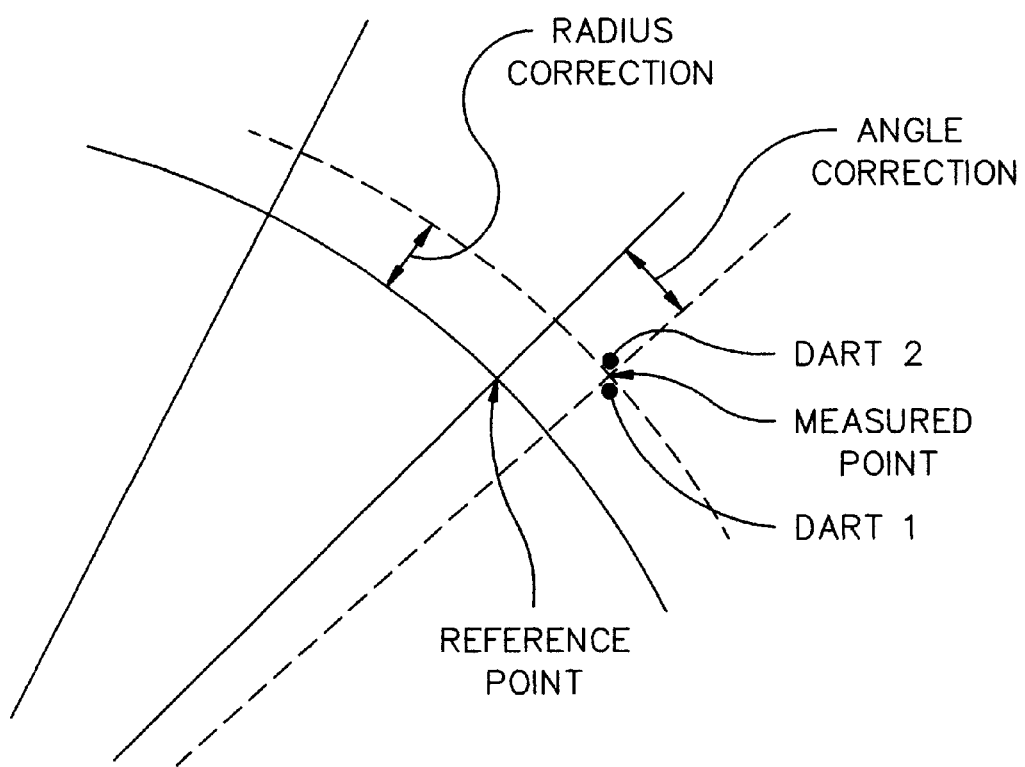
Figure 19B:
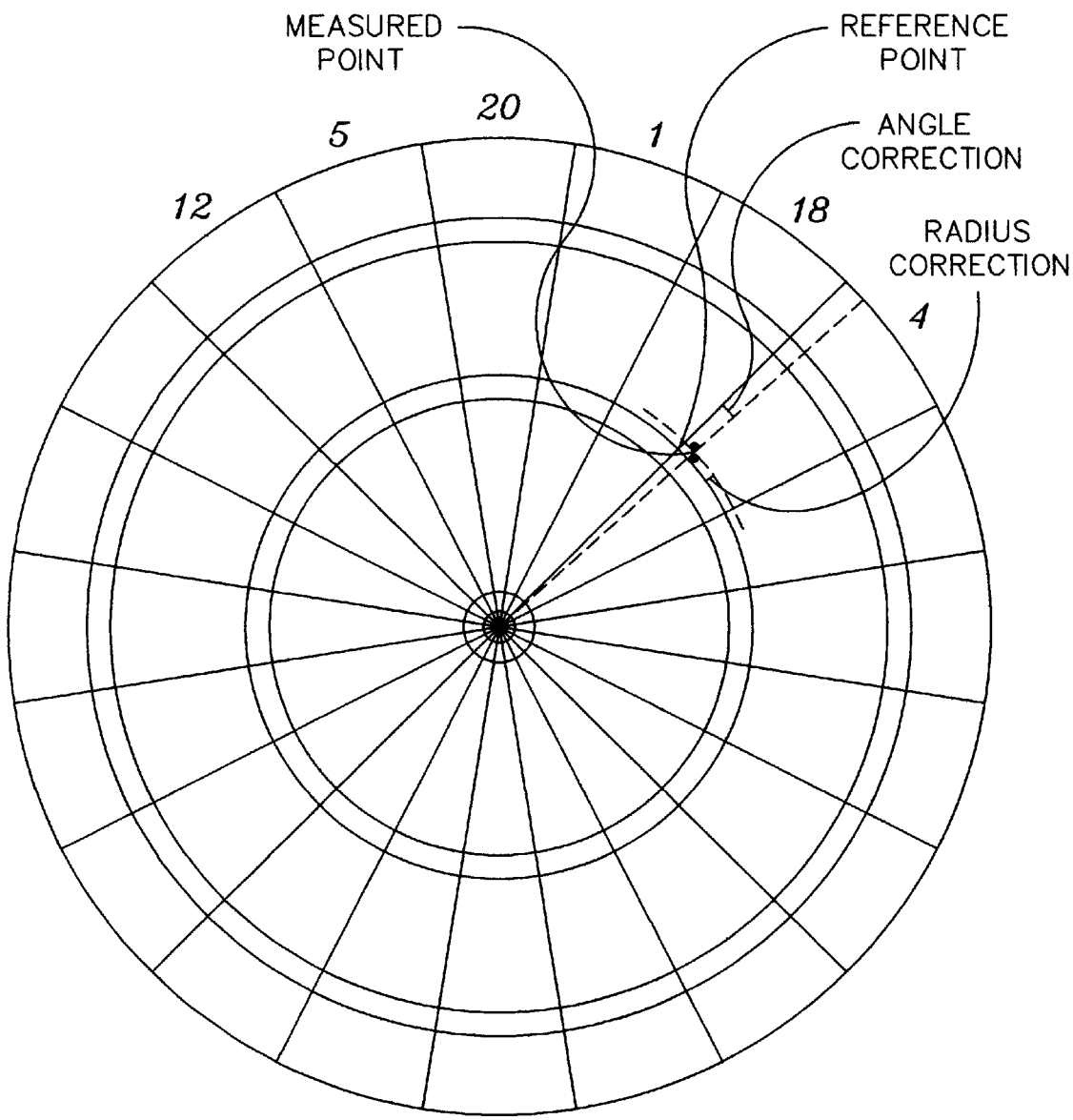

Appendix D, in conjunction with FIGS. 19A–19C, show the steps and geometric considerations of a dartboard calibration procedure. (A preferred calibration procedure is described below with respect to FIGS. 21A, 21B and 22.) The specific sequence of display buttons which are hit will depend upon the programming logic of the specific dartboard display and scoring computer.

Figure 20:
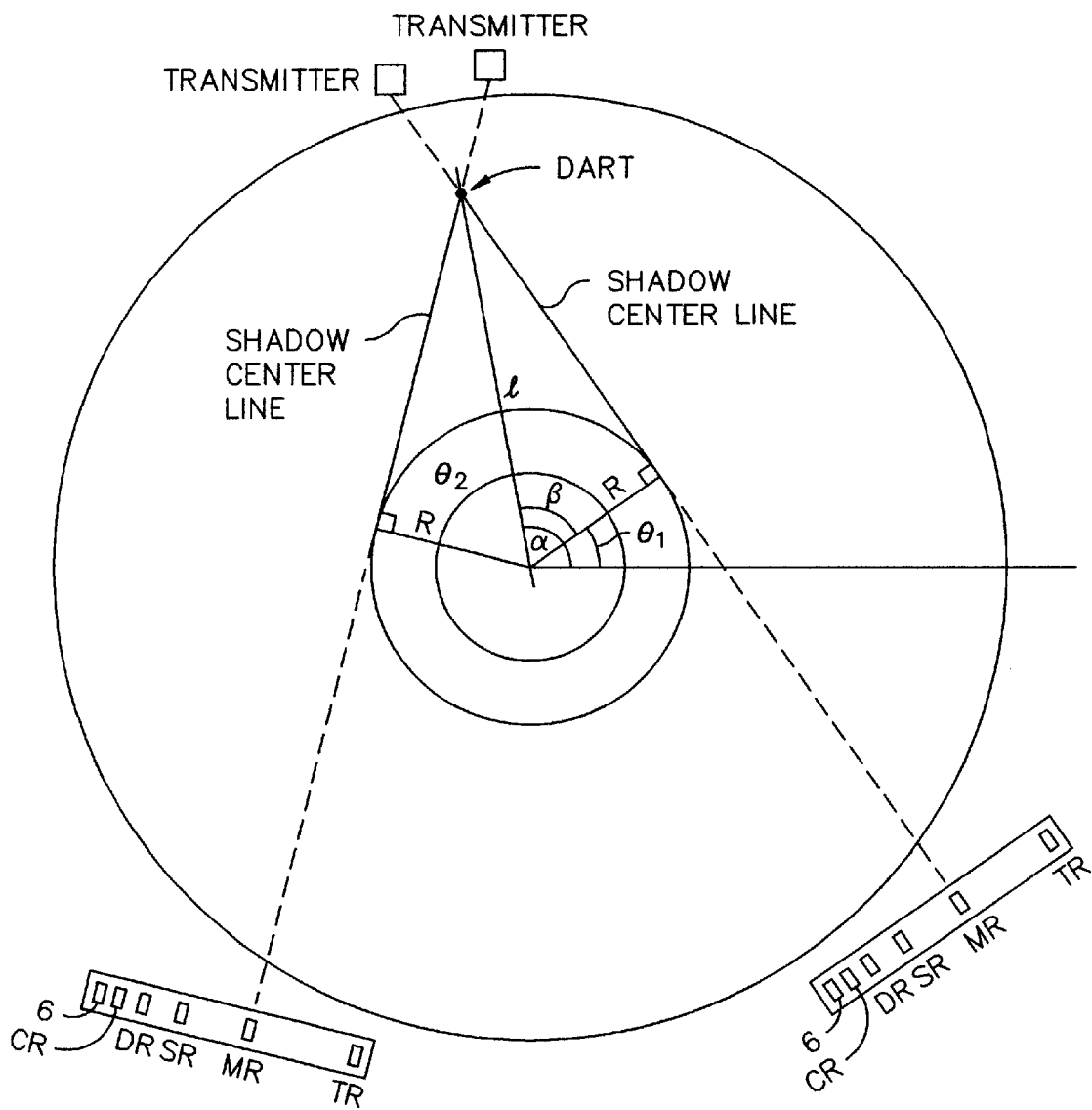
FIG. 20 shows geometrically one example of how to detect the position of a dart after two shadow center lines are determined from two different angular positions of the rotating arm of the present invention.

FIG. 20 shows geometrically one example of how to detect the position of a dart after two shadow center lines are determined from two different angular positions of the rotating arm 44. In this example, signals from receiver MR (also known as receiver 5 or receiver $68_2$) are used for both shadow center lines. No information from any of the other receivers is used. One advantage of using the same receivers for both shadow center lines is that it simplifies the geometry, since the resultant triangles are equal. This speeds up the scoring process, since the calculations are less complex. If different receiver signals are used (e.g., one shadow center line determined from receiver 5, and another shadow center line determined from receiver 6) to find the intersecting point, then geometry must be adjusted because the resultant triangles in FIG. 20 will not be equal. This will cause an additional delay in the scoring process due to the extra calculations.

The following notes should be used in conjunction with FIG. 20:

$$\beta = (\theta_2 - \theta_1)/2$$

$$l = R/\cos \beta$$

Assuming two shadows from one detector R are known, input:

2 encoder readings ("angles")

$$\beta = \mathrm{abs}(\theta_2 - \theta_1)/2 \text{ which is always } < \pi/2$$

$$= (\theta_1 + \theta_2)/2$$

If the two angles are on opposite sides of the origin, the results must be adjusted by $\pi$ $$\beta = \pi - abs(\theta_2 - \theta_1)/2$$
$$= \pi - (\theta_1 + \theta_2)/2$$

Depending on where the scan is started, $\theta_1$ is not necessarily $<\theta_2$, hence use the abs ( ).

End Notes

In sum, the simplest geometry results from the use of the intersection of two shadow center lines obtained from the same receiver 68. A more complex scheme, but equally feasible scheme, is to use the intersection of two shadow center lines obtained from different receivers 68. A still more complex, but also feasible scheme, is to perform a least squares calculation using the shadow center lines obtained from all unobstructed receivers.

As discussed in more detail below, it is not necessary to use the same receiver signal to obtain both shadow center lines which are used to determine the dart location. In many instances, it is not even desirable to use the same receiver signals.

Some considerations that determine which receiver signals should be used and how receivers should be arranged are as follows:

1. Detection signals from receivers which do not clearly indicate that a dart is detected (e.g., noisy signals or signals such as signal 4 in FIG. 10) should not be used to form shadow center lines.

2. The accuracy of the received signal improves as the detection beam moves away from the center of the dartboard 14. This is due to the fact that the longest shadows are cast by the darts which are closest to the dartboard center. A shadow may be in the range of 180 degrees or greater for detection beams defined by receivers CR and 6 which pass at or near the center of the dartboard for a dart that lands at or near the dartboard center. If a dart hits dead center, the dart will cast a 360 degree shadow (i.e., there will be a shadow at all points in the rotation) for a detection beam which passes directly through the center. In contrast, the shadow may be in the range of few degrees for darts which land at edges of the dartboard and which are hit by detection beams defined by receivers MR and TR.

Overlapping shadows cause accuracy problems because an estimation must be made to find the center line of the shadow. Thus, receiver TR provides the most accurate signal, since it receives detection beams which are furthest away from the center of the dartboard 14. Consequently, receivers CR and 6 provide the least accurate signals since they receive detection beams which are closest to the center of the dartboard 14.

3. The receiver TR has the least amount of range, whereas the receivers CR and 6 have the most amount of range. That is, darts which land on outer parts of dart segments are detected by more receivers than darts which land on inner parts of dart segments. Thus, for example, darts which fall near the center of the dartboard 14 do not cast any shadows that can be detected by the receiver TR at any point throughout rotation of the arm 44, whereas almost all darts which land near the center of the dartboard 14 will cast shadows detectable by receivers CR or 6 at two points throughout rotation of the arm 44.

In view of these considerations, one approach to maximizing accuracy is to use the furthest most receivers possible which receive clear detection signals. Another approach, which is preferred and is used in the present embodiment of the invention, is to use a voting and weighting scheme, as follows:

(a) Obtain the dart position (i.e., ring and segment), as determined from each of the six receivers, or from as many receivers as is possible.

(b) Cast a vote for each receiver of the dart position.

(c) Weight the votes by giving greater weight to receivers farthest from the center (and which provide the most accurate shadow center lines, as discussed above), and receivers which have unobstructed, clear views (i.e., receivers which do not have to estimate the shadow center line due to overlapping shadows).

Figure 16:
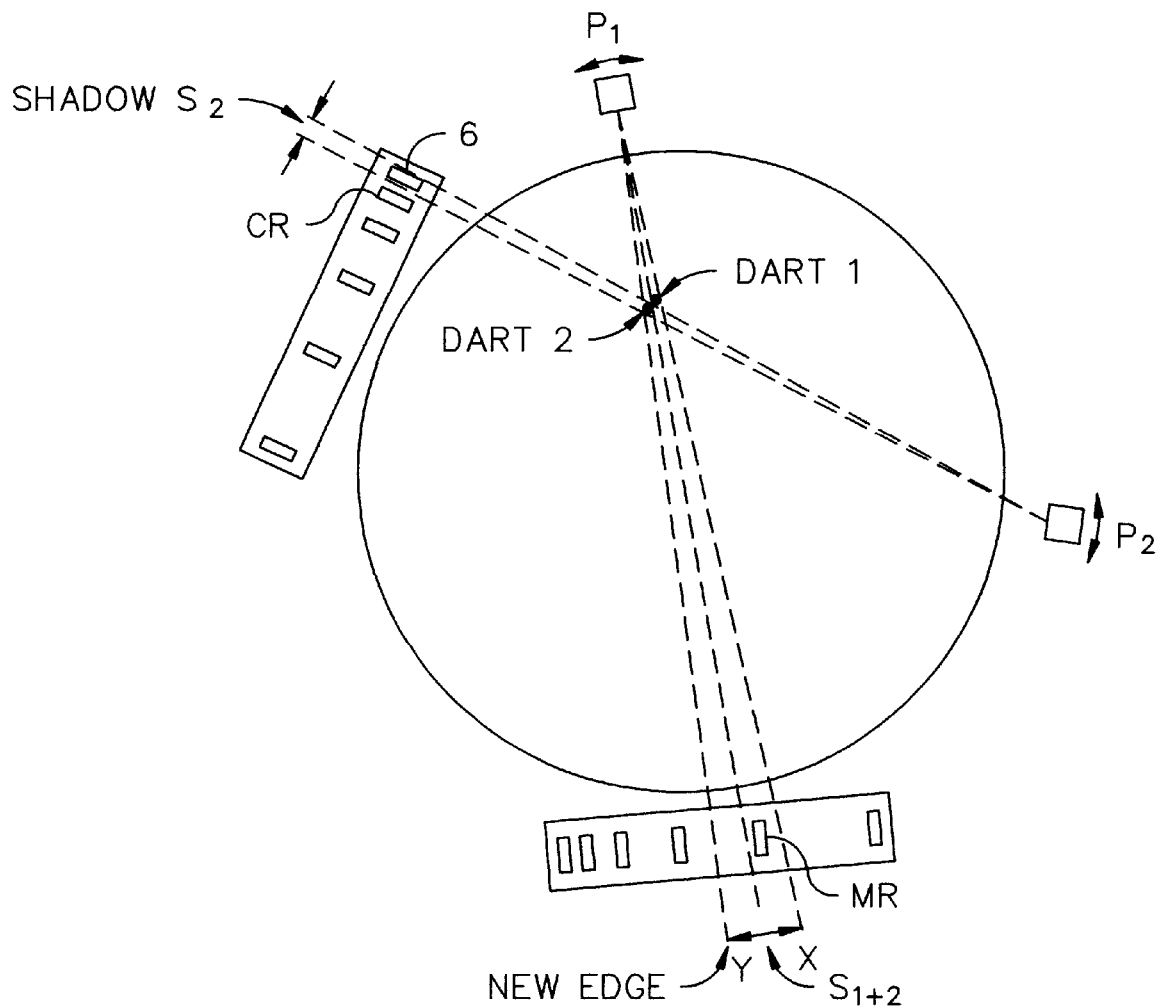
FIG. 16 illustrates aspects of a dart shadow detection scheme for use by the scoring computer of the present invention.

4. Appendix C explains how to determine the center line of the shadow (i.e., the estimated line where the tip of the dart entered the dartboard 14) when there are overlapping shadows. To further explain this process, consider FIG. 16. In FIG. 16, a previously thrown dart 1 and a newly thrown dart 2 casts a single shadow $S_{1+2}$, having a width of X-Y, and which is detected by receiver MR as the transmitter traverses through arc $P_1$. The shadow center line associated with arc $P_1$ may be determined as follows:

(i) Obtain a non-overlapping shadow detected at receiver CR for the new dart 2 at another transmitter arc (i.e., other than transmitter arc $P_1$), such as arc $P_2$. The scoring computer stores all previously determined shadows, so if no previous shadow was detected for receiver CR through arc $P_2$, then it is presumed that the new shadow is the result of the new dart.

(ii) Determine the width of the non-overlapping shadow.

(iii) Take the new edge of the overlapping shadow $S_{1+2}$ and subtract the width of the non-overlapping shadow obtained in step (ii) to determine where the other edge for dart 2 falls along the line X-Y.

(iv) Now that both edges are known, take the midpoint between the two edges and obtain the center line.

5. Referring to FIG. 8, the receivers 68 are concentrated towards one side of the receiver array 72 which is aligned with the center region of the dartboard to improve detection accuracy of darts which land close to the center and in the bullseye region. As discussed above, accuracy decreases for such center darts (due to larger shadows). The extra receivers 68 improve the prospect for obtaining receiver signals which do not require shadow estimations. One preferred arrangement of receivers 3–6 (SR, DR, CR, 6) is shown in FIG. 8, and is illustrated more clearly in FIG. 17, and described as follows:

receiver 3 (SR)—tangent to the single bullseye receiver 4 (DR)—tangent to the double bullseye receiver 5 (CR)—very close to, or directly through the center of the double bullseye receiver 6 (6)—close to, but not directly through the double bullseye This scheme allows for the scoring computer 74 to infer whether a dart is in the double bullseye or single bullseye from the presence or absence of signals from particular receivers. For example, if the receivers 5 and 6 both detect a shadow, a position may be computable in the normal manner. However, if this is not possible, then the scoring computer 74 may examine receiver 4. If receiver 4 does not detect a shadow, but receivers 5 and 6 both detect shadows, then the dart must be in the double bullseye region. Likewise, if receiver 4 detects a shadow, but receiver 3 does not detect a shadow, then the dart must be in the single bullseye region. Additional details regarding dart scoring in the bullseye regions are given in the "Score dart" section of Appendix C.

Figure 21A:
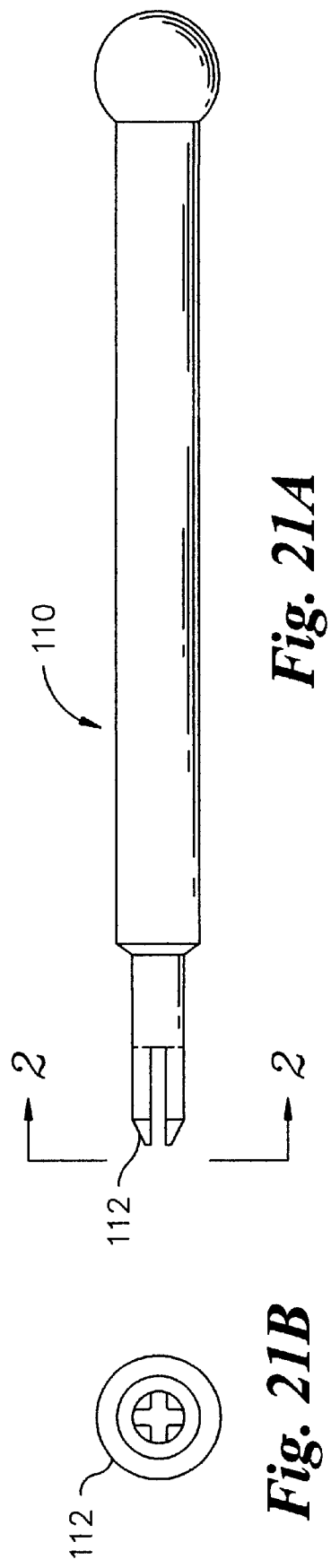
FIGS. 21A and 21B show a calibration tool for use in a preferred dart board calibration procedure.
Figure 21B:
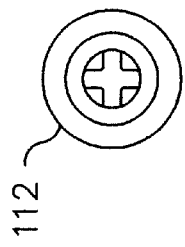

FIG. 21A shows a preferred calibration tool 110 for use with a preferred calibration procedure described below. The calibration tool 110 has a four-prong or two-prong tip 112. FIG. 21B shows an end view of a four-prong tip 112.

Figure 22:
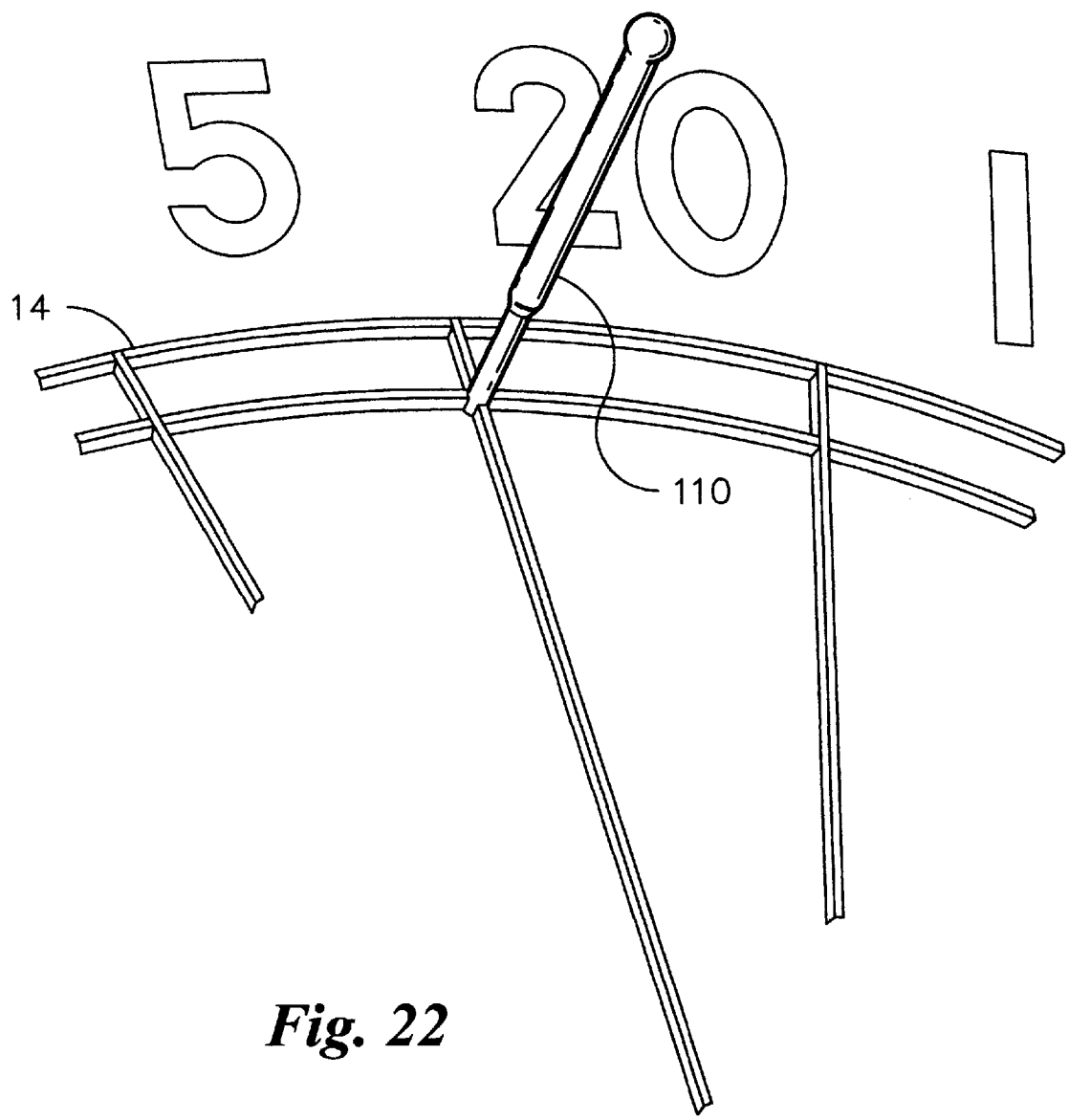
FIG. 22 shows the calibration tool of FIGS. 21A and 21B in place in a portion of a dartboard.

FIG. 22 shows the calibration tool 110 as it appears when placed on the dartboard 14 in preparation for the preferred calibration procedure. The preferred calibration procedure is as follows:

1. The player presses the calibrate button on the display controller.
2. The display controller sends the calibrate command to the scoring computer 74.
3. The scoring computer 74 sends an acknowledgement to the display controller.
4. The display controller indicates that the calibration tool 110 should be placed over the intersection of the outer triple ring and the divider between the 18 and 4 segments.
5. The player places the calibration tool 110 and presses enter on the display controller.
6. The display controller sends a command to the scoring computer 74 to tell it to take the first reading.
7. The scoring computer 74 takes a reading and sends an acknowledgement to the display controller.
8. The display controller display indicates that the calibration tool 110 should be placed over the intersection of the outer triple ring and the divider between the 16 and 7 segments.
9. The player places the calibration tool 110 and presses enter on the display controller.
10. The display controller sends a command to the scoring computer 74 to tell it to take the second reading and perform the calibration computations.
11. The scoring computer 74 takes a reading, performs the calibration computations and sends an acknowledgement to the display controller.
12. The scoring computer saves the calibration results.

The two point calibration helps to adjust for variations in the shape and position of the spider 16 and the mounting of the dartboard 14. Calibration is necessary to adjust for variations in the placement of detectors (i.e., receivers 68) on the scoring computer 74 and rotation of the dartboard 14.

The scoring computer 74 locates the center of an object over the dartboard 14 by using the position that corresponds to the middle of the shadow. For calibration, this information is used to locate specific points on the dartboard 14 by placing the calibration tool 110 or a dart 12 at the point of interest. Using a dart 12, the calibration function is actually locating the center of the dart 12, not the intersection of two dividers of the spider where the dart 12 is placed. Since the dart 12 is adjacent to and not directly over the desired calibration point, the calibration function must adjust the computed location to take into consideration the radius of the dart 12. The radius of darts can vary from manufacturer to manufacturer, introducing an error into the calibration results.

The calibration tool 110 is designed to fit over the spider intersection, thus precisely locating the center of the tool over the calibration point(s). The width of the calibration tool 110 is not significant since the scoring engine inherently locates the centerline of the object over the dartboard 14.

The scope of the present invention is not limited to the particular arrangement of receivers 68, but includes other arrangements which provide sufficient scoring accuracy. A fast and inexpensive scoring computer should minimize the use of complex receiver processing methods, since program storage requirements and score detection time increases rapidly with complexity.

Additional features may be added to improve the dart detection capabilities. For example, FIG. 18 shows a sonic detection circuit 200 for detecting when a dart has struck the dartboard 14. When a steel-tipped dart hits a bristleboard dartboard, an audible thump is generated. The circuit 200 includes a microphone 202 disposed against, in, or near the dartboard 14 and a dart hit detector 204 programmed to detect a frequency or frequencies associated with the thump. The dart hit detector 204 outputs either a high or low signal which is gated to the dart microprocessor U9 shown in FIG. 14A. A high signal indicates that a dart was detected, and the microprocessor should look at the signals from the receivers 68. A low signal indicates that no dart was detected, and the microprocessor should not process any receiver signals. This scheme minimizes false scoring from darts which momentarily land on the dartboard 14 but do not stick to the dartboard 14.

To conserve power and reduce wear of moving mechanical parts, the microprocessor may optionally start a timer after each dart detection and to turn off the drive motor 46 if no subsequent dart hits are detected after a predetermined period of time.

The microprocessor may also optionally keep a running total of the number of times that a dart hits each dartboard segment and output a signal indicating that the dartboard 14 should be rotated after a segment has been hit a predetermined number of times. The microprocessor may also optionally keep a running total of the number of times that a dart hits the dartboard 14 and output a signal indicating that the dartboard 14 should be replaced after the dartboard 14 has been hit a predetermined number of times.

The scoring computer 74 may also be used to automatically advance the display 38 to the next player by detecting the removal of darts from the dartboard front surface. During game play, the object detection device 42 and the scoring computer 74 work together to constantly scan the dartboard 14 for darts and to score any detected hits. When a player's turn is over, the player removes all of the darts from the dartboard 14 before the next player throws any darts. Thus, the scoring computer 74 may determine when all of the darts have been removed from the dartboard 14 and may send a signal to the display controller of the display 38 to automatically advance the display to the next player. In this manner, the player does not need to manually press the player advance button which is provided on conventional displays. In an alternative embodiment of this automatic advancing feature, the display may advance to the next player upon detecting the removal of less than all of the darts, rather than waiting until all of the darts have been removed.

To minimize crosstalk between the receivers 68, the receivers 68 may be selected to operate at different bandwidths, and the transmitter 64 may be selected to output a broad range of frequencies, including each of the different bandwidths.

Although the present invention is described in a dartboard embodiment, the principles set forth above are equally applicable to other types of surfaces, and the scope of the invention includes object detection systems for other types of objects and surfaces.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX A
PARTS LIST OF MECHANICAL COMPONENTS

| DESCRIPTION | QTY. | MFG. PROCESS | COMMENTS |
|---|---|---|---|
| Front Cover | 1 | Injection Molded | |
| Rear Cover | 1 | Injection Molded | |
| Motor Plate, Lower | 1 | Metal Stamping | Convert to Molded Part |
| Rotor | 1 | Injection Molded | |
| Support Hub (Shaft) | 1 | Injection Molded | |
| Flange, Hub Support | 1 | Injection Molded | |
| Retainer (Lock Sleeve) | 1 | Injection Molded | |
| Drive Shaft | 1 | Screw Machine | |
| Drum | 1 | Injection Molded | Convert From Pulley |
| Slip Ring | 3 | Screw Machine | |
| Slip Ring Spacer | 3 | Injection Molded | |
| Collar, Encoded Disk | 1 | Injection Molded | |
| Core | 1 | Injection Molded | |
| Adaptor | 1 | Screw Machine | |
| Rotating Arm | 1 | Stamping | |
| Brush Spring Assy | 6 | Special | |
| Brush Holder | 2 | Injection Molded | |
| Emitter Support | 1 | Injection Molded | |
| Emitter Mount | 1 | Injection Molded | |
| Spacer 1 | 2 | Injection Molded | |
| Pulley | 1 | Injection Molded | |
| Crowned Pulley | 1 | Injection Molded | |
| Spacer 3 | 4 | Injection Molded | |
| Bushing 1 | 4 | Injection Molded | |
| Bearing Mount | 1 | Injection Molded | |
| Spacer 4 | 2 | Injection Molded | |
| Pulley | 1 | Injection Molded | Design as Molded Part |
| Stretch Belt, .080 Pitch, 85T, .12W | 1 | Purchased | |
| Stretch Belt, .03 × .31 × 27.25 LG. | 1 | Purchased | |
| Ball Bearing (50 ID × 72 OD × 12 W) | 2 | Purchased | |
| Ball Bearing (6 ID × 13 OD × 3.5 W) | 2 | Purchased | |
| Motor | 1 | Purchased, Special | |
| Power Supply PCB | 1 | Purchased, Special | |
| Scoring Engine PCB | 1 | Purchased, Special | |
| Sound Isolation Bushings | 4 | Purchased | |
| Encoder Disk | 1 | Purchased, Special | |
| Encoder Dust Cover | 1 | Injection Molded | |
| Encoder Sensor Assy | 1 | Purchased, Special | |
| Emitter Assembly | 1 | Purchased, Special | |
| Dart Board | 1 | Purchased, Special | |
| Display Panel Assembly | 1 | Purchased, Special | |
| Display Panel Cord (Phone Cord) | 1 | Purchased, Special | |
| External Transformer | 1 | Purchased, Special | |

APPENDIX B
PARTS LIST OF HARDWARE COMPONENTS IN FIGS. 12, 13A–13G AND 14

| VALUE | SIZE | QTY. | DESIGNATOR | MANUFACTURER | PART NO. |
|---|---|---|---|---|---|
| 10R 5% | 1206 | 1 | R201 | Panasonic | ERJ-8GEYJ |
| 22R 1W 5% | Axial0.6 | 1 | R123 | Yageo | 22E MO-1 W-B 5% |
| 56R 5% | 1210 | 3 | R104, R105, R106 | Panasonic | ERJ-14Y |
| 100R 1% | 1206 | 4 | R110, R111, R112 (*10K), R113 (*10K) | Panasonic | ERJ-8ENF |
| 200R 1% | 0805 | 6 | R7, R24, R41, R58, R75, R92 | Panasonic | ERJ-6ENF |
| 1.00k 1% | 0805 | 26 | R3, R8, R9, R10, R20, R25, R26, R27, R37, R42, R43, R44, R54, R59, R60, R61, R71, R76, R77, R78, R88, R93, R94, R95, R107, R108 | Panasonic | ERJ-6ENF |
| 4.02k 1% | 0805 | 6 | R4, R21, R38, R55, R72, R89 | Panasonic | ERJ-6ENF |
| 4.7k 5% | 0805 | 1 | R103 | Panasonic | ERJ-6RSJ |
| 6.8k 5% | 0805 | 6 | R11, R28, R45, R62, R79, R96 | Panasonic | ERJ-6RSJ |
| 10.0K 1% | 0805 | 34 | R1, R5, R12, R14, R16, R18, R22, R29, R31, R33, R35, R39, R46, R48, R50, R52, R56, R63, R65, R67, R69, R73, R80, R82, R84, R86, R90, R97, R99, R101, R109, R114, R118, R122 | Panasonic | ERJ-6ENF |

-continued

APPENDIX B
PARTS LIST OF HARDWARE COMPONENTS IN FIGS. 12, 13A–13G AND 14

| VALUE | SIZE | QTY. | DESIGNATOR | MANUFACTURER | PART NO. |
|---|---|---|---|---|---|
| 21.5K 1% | 0805 | 6 | R15, R32, R49, R66, R83, R100 | Panasonic | ERJ-6ENF |
| 49.9K 1% | 0805 | 2 | R116, R120 | Panasonic | ERJ-6ENF |
| 100k 1% | 0805 | 18 | R2, R6, R17, R19, R23, R34, R36, R40, R51, R53, R57, R68, R70, R74, R85, R87, R91, R102 | Panasonic | ERJ-6ENF |
| 1.00M 1% | 0805 | 8 | R13, R30, R47, R64, R81, R98, R117, R121 | Panasonic | ERJ-6ENF |
| S.I.T. | 0805 | 1 | R115 | Panasonic | ERJ-6ENF |
| S.I.T. | 0805 | 1 | R119 | Panasonic | ERJ-6ENF |
| 27p NPO | 0805 | 2 | C32, C33 | Panasonic | ECU-V1H |
| 1000p NPO | 0805 | 6 | C1, C6, C11, C16, C21, C26 | Panasonic | ECU-V1H |
| 1800p NPO | 0805 | 1 | C41 | Panasonic | ECU-V1H |
| 0.022u Z5U | 0805 | 6 | C2, C7, C12, C17, C22, C27 | Murata Erie | GRM-40 |
| 0.047u Z5U | 0805 | 6 | C4, C9, C14, C19, C24, C29 | Murata Erie | GRM-40 |
| 0.1u Z5U | 0805 | 2 | C36, C42 | Murata Erie | GRM-40 |
| 0.1u Z5U | 1206 | 4 | C34, C35, C37, C38 | Murata Erie | GRM-40 |
| 0.22u Z5U | 0805 | 6 | C3, C8, C13, C18, C23, C28 | Murata Erie | GRM-40 |
| 10u 6.3V | 1206 | 7 | C5, C10, C15, C20, C25, C30, C31 | Panasonic | ECS-T0JY106R |
| 470u 6.3V | F-size | 9 | C39, C40, C43, C44, C45, C46, C47, C48, C49 | Panasonic | ECE-V0JA471P |
| 2N3904 | SOT-23 | 20 | Q1, Q3, Q4, Q5, Q7, Q8, Q9, Q11, Q12, Q13, Q15, Q16, Q17, Q19, Q20, Q21, Q23, Q24, Q28, Q29 | Zetex | FMMT3904 |
| 2N3906 | SOT-23 | 6 | Q2, Q6, Q10, Q14, Q18, Q22 | Zetex | FMMT3906 |
| IRLZ14 | TO-220 | 1 | Q30 | International Rectifier | IRLZ14 |
| LMC662 | SO-8 | 7 | U2, U3, U5, U6, U7, U8, U13 | National | E |
| CD4066 | SO-14 | 2 | U1, U4 | Harris | |
| PDI-E801 | T-1¾ | 1 | LED4 | Photonic Detectors, Inc. | PDI-E801 |
| PN334PA | 0.1" | 6 | PIN1, PIN2, PIN3, PIN4, PIN5, PIN6 | Panasonic | PN334PA |
| ZVN3306 | SOT-23 | 3 | Q25, Q26, Q27 | Zetex | ZVN3306F |
| 80C52 | PLCC44 | 1 | U9 | Phillips | P80C32EBAA (low cost option) P87C52EBAA (secure option) |
| | | | | Integrated Silicon Solution, Inc. | IS89C52-20PL (secure alternate) |
| 16K × 8 EPROM | PLCC32 | 1 | U11 | AMD | AM27C128 |
| 8K × 8 SRAM | SOP-28 | 1 | U12 | Mosel Vitelic | MS6264L-100FC |
| | | | | Integrated Silicon Solution, Inc. | 1S62C64-100U (alternate) |
| 12MHz | HC-49 | 1 | Y1 | ECS, Inc. | ECS-120-32-4 |
| 74HC14 | SO-14 | 1 | U14 | Harris | |
| 74HC373 | SOL-20 | 1 | U10 | Harris | |
| Super bright LED | T-1¾ | 3 | LED1, LED2, LED3 | Toshiba | TLSH180P |
| 32-pin socket | PLCC | 1 | (for U11) | Aries | |
| 44-pin socket | PLCC | 1 | (for U9) | Aries | |
| 3-pin connector | 0.1" header | 4 | J1, J2, J3, J5 | | |
| Circuit Board | | | | | ISD971105-1 |

APPENDIX C
Scoring Engine Program Flow
The following sequence is repeated continuously:
Tick for tick—Collect samples for 1 revolution
If the number of sample changes=2 and darts thrown this round>0
All darts have been removed, reset values for the next player else if current samples>previous samples
if darts thrown<3
n=0
do
n=n+1
prepare the detectors for scoring
Tick for tick—Collect samples for 1 revolution
Shadow capture—extract the shadow edges for each detector from the samples
Find darts—compute the dart position for each detector
Score dart—consolidate the results of the detectors while the number of results>n
if a satisfactory result was found send the result to the front panel save the edge information for the next dart
else check for calibration mode
Calibrate—calibrate the unit
The following is a description of individual functions:
Tick for Tick There are 512 encoder ticks per revolution. The program samples the detector and encoder information repeatedly looking for changes. When a change occurs, the program stores the number of ticks before the change, the time since the last tick and the data. When the next tick occurs, the program divides the time into eighths and computes which eighth the change occurred in and stores this along with the other data. This is repeated until all 512 encoder ticks have been seen.

Dividing the 512 encoder ticks into eight intervals give an effective sampling interval of 1 in 4096.

Shadow Capture

This function extracts the rising and falling edge pairs for each detector from the data collected in Tick for tick. Subsequent processing is done for each detector independent of the others.

Find Darts

This function first attempts to find the center of the shadows corresponding to a new dart. This is done by matching the current edges against the previous edges. If both edges of a pair do not match any previous edges, it is considered a new shadow. If one edges matches and the other doesn't, it is considered a hidden shadow. Edge pairs that match previous edges are ignored in subsequent processing. Previous edge pairs that can no longer be accounted for may indicate a dart that has fallen out.

If at least one new shadow and one hidden shadow have been found, the program tries to find the centers of the shadows. This is done by finding the value exactly between the two edges. For hidden shadows, it is necessary to find the "hidden" edge by subtracting the width of the new shadow from the new edge of the hidden shadow. The centers of the shadows correspond directly to the angle of the PC board when the detector is centered on the dart.

If the function is able to find two angles, it can compute the distance (r) and angle (theta) of the dart using similar triangles.

theta=(angle$_1$+angle$_2$)/2−calibrated angle offset r=calibrated detector radius /cos (theta)

The r and theta values are converted to a ring and segment of the dart board which are returned from the function. If the function is unable to find two angles, no ring and segment are returned and the detector is not used in scoring the dart.

Score Dart

This function takes the ring and segment results from each of the detectors and resolves any discrepancies using a priority weighting system. In general, the detector farthest from the center of the board without any hidden edges is given the most weight.

In cases near the center of the board where the dart position measurement is less reliable because the shadows are larger, and in/out test is used to verify results. Two detectors are placed such that they are tangent to the single bull and double bull rings. If a center detector "sees" a shadow and the double bull detector does not see it, a double bull is scored. Likewise, if a center detector or the double bull detector "sees" a shadow and the single bull detector does not, a single bull is scored.

The result of the function is the scoring weight (single, double, triple) and the segment of the dart scored. The number of different results is also available to judge the quality of the result.

Calibrate

This function is used to compensate for variations in the position of the detectors and the rotation of the board. A measurement is taken of one or more darts in known positions. The difference between the known location and the measured position is stored for each detector. These values of r and theta are then used to correct the computed positions of the darts during normal scoring.

APPENDIX D

Dart Board Calibration Procedure

To perform a calibration:

1. Throw 3 darts
2. Press any player button to reset dart counter
3. Place your fist on the board, the LED's will come on
4. Remove your fist and place it back on the board, the LED's go off and the unit beeps and displays a 1
5. Remove fist and all darts
6. Place a dart in the triple 4 in the corner closest to 18 and the outer edge of the board
7. The unit beeps and displays a 2
8. Remove the dart, wait briefly and place the dart in the corner of the single 18 near the outer triple ring and the 4 (i.e., in the diagonally opposite corner of the intersection of the 4–18 segment divider and the outer triple divider)
9. The unit should beep and display 3 or 6
10. Remove the dart, the board is calibrated Notes If the LED's come on during game play, remove all darts and wait 10 seconds. If the LED's do not go off, turn the unit off and back on. The calibration will not be affected.

If the second or third beep above does not happen within 5 seconds after placing the dart, remove the dart, wait 5 seconds and replace it.

If any problems occur, turn unit off and back on to reset it.

What is claimed is:

1. An apparatus for detecting the presence and location of at least one object in a field, the apparatus comprising:

(a) a rotating arm which spins around the field, the rotating arm including (i) a transmitter and, (ii) an opposing receiver array mounted thereon, the receiver array including a plurality of receivers located horizontally coplanar with each other, the transmitter and receiver array being fixed relative to each other, the transmitter outputting a detection beam that emanates from a single point, overlaps the field, and is simultaneously received at all times by the plurality of receivers of the receiver array, the receivers detecting changes which occur in the field as a result of an object being in the field, wherein the changes which occur in the field are shadows caused by one or more objects being in the field;

(b) a position sensor for detecting the angular displacement of the rotating arm relative to a fixed point; and (c) a processor for receiving output signals from the plurality of receivers and angular displacement data corresponding to the output signals, and determining therefrom the presence and location of an object in the field.

2. An apparatus according to claim 1 wherein the field is a dartboard front surface and the detected object in the field is a dart which lands on the dartboard front surface.

3. An apparatus according to claim 2 wherein the receivers are concentrated towards one side of the receiver array which is aligned with a center region of the dartboard.

4. An apparatus according to claim 3 wherein the dartboard includes a single bullseye and a double bullseye and the receiver array includes six receivers, the third receiver being located so that the detection beam is tangent to the single bullseye, the fourth receiver being located so that the detection beam is tangent to the double bullseye, the fifth receiver being located so that the detection beam is very close to, or directly through the center of the double bullseye, and the sixth receiver being located so that the detection beam is close to, but not directly through the double bullseye.

5. An apparatus according to claim 2 further comprising:
(d) a sonic dart hit detector having a first output when no dart hit is detected, and a second output when a dart hit is detected, the outputs of the sonic dart hit detector being electrically connected to the processor, wherein the processor processes the receiver output signals only when the sonic dart hit detector generates the second output.

6. An apparatus according to claim 2 wherein the detection beam projects about 2.5 mm to about 3.25 mm above the dartboard front surface.

7. An apparatus according to claim 2 wherein the processor keeps a running total of the number of times that a dart hits each dartboard segment and outputs a signal indicating that the dartboard should be rotated after a segment has been hit a predetermined number of times.

8. An apparatus according to claim 2 wherein the processor keeps a running total of the number of times that a dart hits the dartboard and outputs a signal indicating that the dartboard should be replaced after the dartboard has been hit a predetermined number of times.

9. An apparatus according to claim 1 wherein the processor uses output signals from a single receiver obtained at two different angular positions of the rotating arm to detect the presence and location of the object in the field.

10. An apparatus according to claim 9 wherein the processor uses the output signals from the furthest most receiver from the center of the field which receives clear output signals.

11. An apparatus according to claim 9 wherein the processor uses output signals from a plurality of the receivers obtained at two different angular positions of the rotating arm to detect the presence and location of the object in the field by:
(i) obtaining the object location from as many receivers as is possible,
(ii) casting a vote for each receiver of the object location, and
(iii) weighting the votes by giving greater weight to receivers farthest from the center of the field, and receivers which have unobstructed, clear views of the detection beam.

12. An apparatus according to claim 1 wherein the transmitter's detection beam is a divergent beam.

13. An apparatus according to claim 1 wherein the transmitter is an LED which emits primarily in the non-visible infrared region.

14. An apparatus according to claim 1 wherein the transmitter detection beam is formed from a plurality of individual narrow beams which emanate from the same point and are aimed at respective individual receivers.

15. An apparatus according to claim 1 wherein each of the receivers operate at different bandwidths, and the transmitter outputs a plurality of frequencies, including each of the different bandwidths, thereby minimizing crosstalk between the receivers.

16. An apparatus according to claim 1 wherein the processor processes the output signals from the plurality of receivers only during the time periods when the transmitter outputs the detection beam.

17. An apparatus according to claim 1 further comprising:
(d) a drive motor for causing rotation of the rotating arm, wherein the processor causes the drive motor to turn off if after a predetermined period of time, no output signals are received from the plurality of receivers indicating the presence of an object.

18. An apparatus comprising:
(a) a dartboard having a front surface, the dartboard including:
(i) a bristle dartboard,
(ii) an inner bull and an outer bull arranged concentrically on the bristle dartboard, and
(iii) a framework of interlocked, radial strips and circumferential strips mounted on the bristle dartboard to delineate different scoring segments, each radial strip being connected to the outer bull and a plurality of the radial strips being also connected to the inner bull; and
(b) a device for detecting the presence and location of at least one dart on the dartboard front surface, the device comprising:
(i) a rotating arm which spins around the dartboard front surface, the rotating arm including at least one transmitter and at least one opposing receiver mounted thereon, the at least one transmitter and the at least one receiver being fixed relative to each other, the at least one transmitter outputting a detection beam that overlaps the dartboard front surface, and is received by the at least one receiver which detects changes that occur in the dartboard front surface as a result of a dart being in the dartboard;
(ii) a position sensor for detecting the angular displacement of the rotating arm relative to a fixed point; and
(iii) a processor for receiving an output signal from the at least one receiver and angular displacement data corresponding to the output signal, and determining therefrom the presence and location of a dart in the dartboard.

19. An apparatus according to claim 18 wherein the outer bull of the dartboard includes a plurality of slots equal in number to the number of radial strips.

20. An apparatus according to claim 19 wherein each radial strip of the dartboard includes a plurality of spaced apart slots for receiving a circumferential strip and for being received in a corresponding slot in the outer bull.

21. An apparatus according to claim 20 wherein the inner bull of the dartboard includes a plurality of openings spaced equally about its circumference for receiving an end of a respective radial strip.

22. An apparatus according to claim 18 wherein the framework of interlocked, radial strips and circumferential strips define a spider which projects above the dartboard front surface.

23. An apparatus according to claim 22 wherein the spider projects above the dartboard front surface about 1.0 mm to about 1.75 mm, and the detection beam projects about 2.5 mm to about 3.25 mm above the dartboard front surface.

24. An apparatus according to claim 18 wherein the inner bull of the dartboard includes a plurality of openings spaced equally about its circumference for receiving an end of a respective radial strip.

25. An apparatus according to claim 18 wherein the at least one receiver comprises a receiver array, and the at least one transmitter is a single transmitter, the receiver array including a plurality of receivers located horizontally coplanar with each other, the transmitter and receiver array being fixed relative to each other, the transmitter outputting a detection beam that emanates from a single point, overlaps the dartboard front surface, and is simultaneously received at all times by the plurality of receivers of the receiver array, the receivers detecting changes which occur in the dartboard front surface as a result of a dart being in the dartboard.

26. An apparatus according to claim 18 wherein the detection beam projects about 2.5 mm to about 3.25 mm above the dartboard front surface.

27. An apparatus according to claim 18 wherein the framework of interlocked, radial strips and circumferential strips define a spider which is flush with the dartboard front surface.

28. An apparatus according to claim 18 wherein the framework of interlocked, radial strips and circumferential strips define a spider which is embedded within the dartboard front surface.

* * * * *